United States Patent

Matsubara et al.

[11] Patent Number: 5,940,189
[45] Date of Patent: Aug. 17, 1999

[54] FACSIMILE APPARATUS CAPABLE OF RECOGNIZING HAND-WRITTEN ADDRESSING INFORMATION

[75] Inventors: Shigetoshi Matsubara; Junji Tanaka; Kazushi Honjo; Tatsuji Kishida; Koichi Takata, all of Tottori-ken, Japan

[73] Assignees: Sanyo Electric Co., Ltd, Osaka; Tottori Sanyo Electric Co., Ltd, Tottori-ken, both of Japan

[21] Appl. No.: 08/644,708

[22] Filed: May 10, 1996

[30] Foreign Application Priority Data

| May 10, 1995 | [JP] | Japan | 7-111997 |
| May 11, 1995 | [JP] | Japan | 7-112969 |
| May 12, 1995 | [JP] | Japan | 7-114845 |
| Nov. 30, 1995 | [JP] | Japan | 7-312065 |
| Mar. 8, 1996 | [JP] | Japan | 8-051804 |

[51] Int. Cl.$^6$ .............. H04N 1/00; H04N 1/40; G06K 9/20; H04M 11/00
[52] U.S. Cl. ............ 358/440; 358/400; 358/462; 382/186; 382/317; 379/100.07; 379/100.14
[58] Field of Search .............. 382/177, 179, 382/186, 309, 317; 358/402, 440, 438, 434, 400, 405, 448, 465, 474, 471, 496, 498, 462, 470; 379/100.01, 100.07, 100.14

[56] References Cited

U.S. PATENT DOCUMENTS 4,562,594  12/1985  Bednar et al. .................. 382/178
5,126,858  6/1992  Kurogane et al. ................ 358/450
5,247,591  9/1993  Baran .............................. 358/440

FOREIGN PATENT DOCUMENTS 9 465 911 A2  1/1992  European Pat. Off. ......... H04N 1/32
WO 91/01606  2/1991  WIPO ............................ H04N 1/00

Primary Examiner—Kim Yen Vu
Assistant Examiner—Kimberly A. Williams
Attorney, Agent, or Firm—Darby & Darby

[57] ABSTRACT

A facsimile apparatus includes a transmission motor (90), and when an original to be transmitted is moved by the transmission motor in a sub-scanning direction, sequential lines in the sub-scanning direction are scanned by a contact image sensor (100) in a main scanning direction, and therefore, image data of a black dot or a white dot is outputted by the contact image sensor. A microcomputer (60) specifies a line in which a black dot outputted from the contact image sensor first exists as a start line, and specifies an area on the basis of the start line and an end line which is determined by a fact that three white lines in which no black dots are detected appear after the start line. Addressing information is recognized on the basis of the image data outputted from the contact image sensor which is scanning the area.

46 Claims, 30 Drawing Sheets

* * * ENTRY GUIDE * * *

```
        ┌─ 1
  2                                           3
  ├─  4 3 2 1 - 5 6 - 7 8 9 0  ─┤
              5─┤    ├─ 4
(EXAMPLE OF ORIGINAL)
   FACSIMILE PAPER              DATE: MAY 1, 1996

TO:                             FROM:

<POINT FOR ENTRY OF NUMBER>

*PLEASE WRITE NUMERALS IN BLANK AT HEAD OF ORIGINAL WITH
         SEPARATING ONE BY ONE CHARACTER
  *USABLE CHARACTERS ARE NUMERALS (0-9), -(HYPHEN) AND SPACE
  *WISH TO KNOW DETAILS, PLEASE SEE SECTION OF "TRANSMISSION
       BY HAND-WRITING NUMBER" IN OPERATION MANUAL
```

1  5-25mm
2  MORE THAN 20mm
3  MORE THAN 35mm
4  2-19mm
5  MORE THAN 5mm

F I G. 1
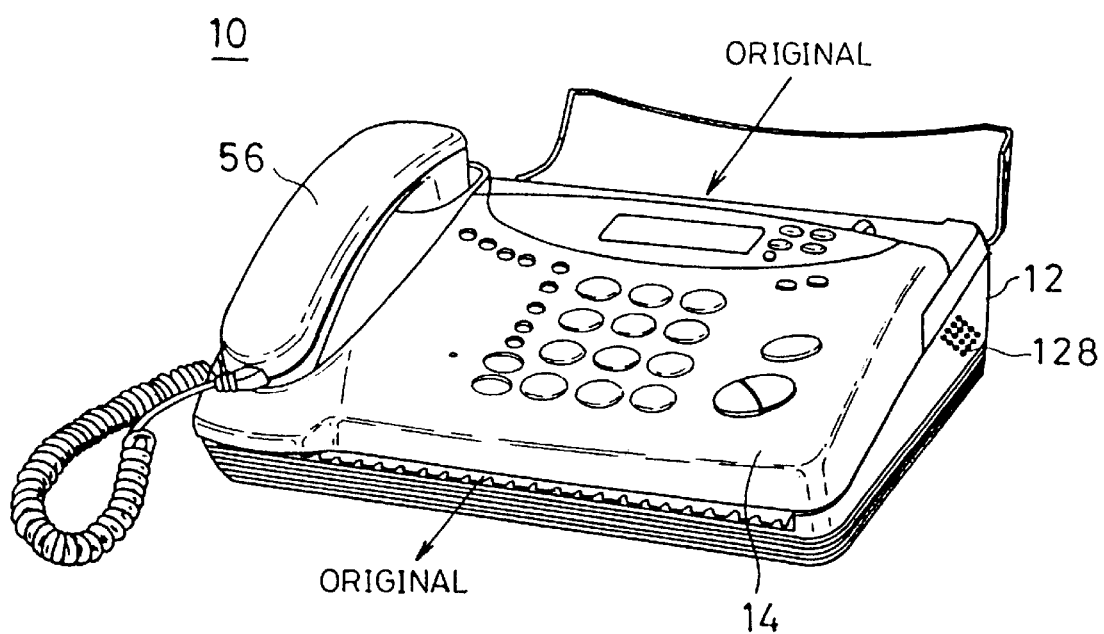

76

MEMORY SWITCH 76a

| ERROR PROCESSING MODE (EMODE) | RECOGNITION CON-FIRMATION TIME (CT) | READ TRANSMISSION MODE (SMODE) |
|---|---|---|
| NUMBER TRANSMISSION MODE (NSMODE) | | |

FLAG 76b

| PRE-READ FLAG (SF) | VALID IMAGE AREA FLAG (AF) | VALID CHARACTER FLAG (BCNT) |
|---|---|---|
| ERROR FLAG (EF) | AUTOMATIC RECOGNITION FLAG (RF) | ENTRY GUIDE FLAG (GF) |
| CONFIRMATION PRINT FLAG (CPF) | AUTOMATIC RECOGNITION TRANSITION FLAG (CAF) | |

COUNTER, POINTER & VARIABLE 76c

| ORIGINAL FEED COUNTER (PCNT) | WRITE LINE COUNTER (LCNT) | VALID LINE COUNTER (BCNT) |
|---|---|---|
| WHITE LINE COUNTER (WCNT) | | |
| CHARACTER NUMBER COUNTER (MCNT) | COLUMN POINTER (CPNT) | FIRST CHARACTER DATA COUNTER (DCNT1) |
| DIAL BUFFER WRITE POINTER (DLBW) | SECOND TABLE READ POINTER (TRPT) | SECOND CHARACTER DATA COUNTER (DCNT2) |
| WHITE LINE TRANSMISSION COUNTER (WLSC) | LINE BUFFER READ POINTER (LBRP) | SPACE COUNTER (SCNT) |
| TIMER COUNTER (TC) | REJECTED CHARACTER NUMBER COUNTER (RJC) | |
| AVERAGE DISTANCE REGISTER (AL) | SPACE WIDTH REGISTER (SP) | |

70
DIAL BUFFER (32 DIGITS × 1BYTE)

72
FIRST CHARACTER DATA TABLE (TBL1)

74
SECOND CHARACTER DATA TABLE (TBL2)

FIG. 6

| 1 | 5-25mm |
| 2 | MORE THAN 20mm |
| 3 | MORE THAN 35mm |
| 4 | 2-19mm |
| 5 | MORE THAN 5mm |

FIG. 8

→ COLUMN

```
       12345·······································2048
   1  0000000000000000000000000000000000000000000000  ····  0
   2  000000000000000●●●0000000000000000●●●●●●●●●●●●000000000000  ····  0
   3  00000000000000●●●●000000000000000●●●●●●●●●●●●●0000000000  ····  0
   4  000000000000●●●●00000000000000●●●00000000000●●●●0000000000  ····  0
   5  00000000000●●●●000000000000000000000000000●●●●00000000000  ····  0
   6  0000000000●●●●00000000000000000000000000●●●●0000000000  ····  0
   .
   .
 125  000000000000000000000000000●●●●●●●●●●●●●●●0000000000  ····  0
 126  00000000●●●●000000000000000●●●●●●●●●●●●●●0000000000  ····  0
 127  00000000000000000000000000000000000000000000  ····  0
 128  00000000000000000000000000000000000000000000  ····  0
 129  00000000000000000000000000000000000000000000  ····  0
```

↑ LINE

↗ 68

[3 CCNT]

[2 CCNT]

[1 CCNT]

[2048 CCNT]

FIG. 9

FIRST (SECOND) CHARACTER DATA TABLE            7 2 (74)

|  | 1ST STORAGE PORTION | 2ND STORAGE PORTION | 3RD STORAGE PORTION | 4-TH STORAGE PORTION | ... | 32ND STORAGE PORTION |
|---|---|---|---|---|---|---|
| X-START | A(1) | A(2) | A(3) | A(4) | ... | A(32) |
| Y-START | B(1) | B(2) | B(3) | B(4) | ... | B(32) |
| X-WIDTH | C(1) | C(2) | C(3) | C(4) | ... | C(32) |
| Y-WIDTH | D(1) | D(2) | D(3) | D(4) | ... | D(32) |

F I G. 10
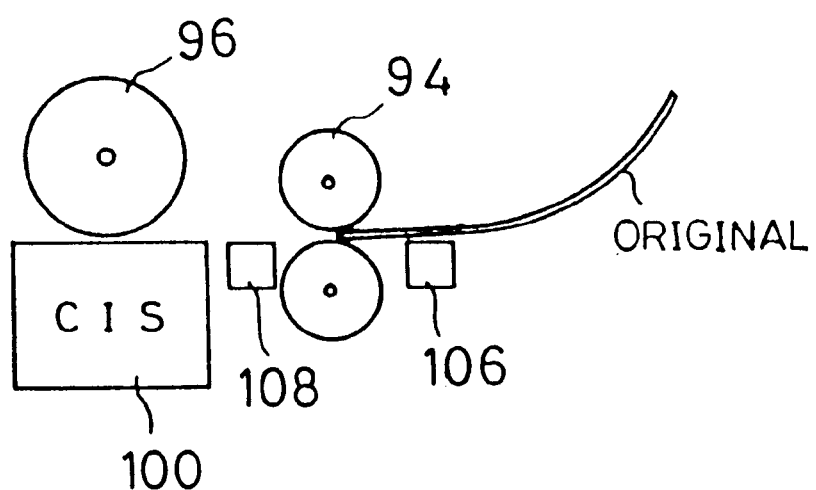

F I G. 18
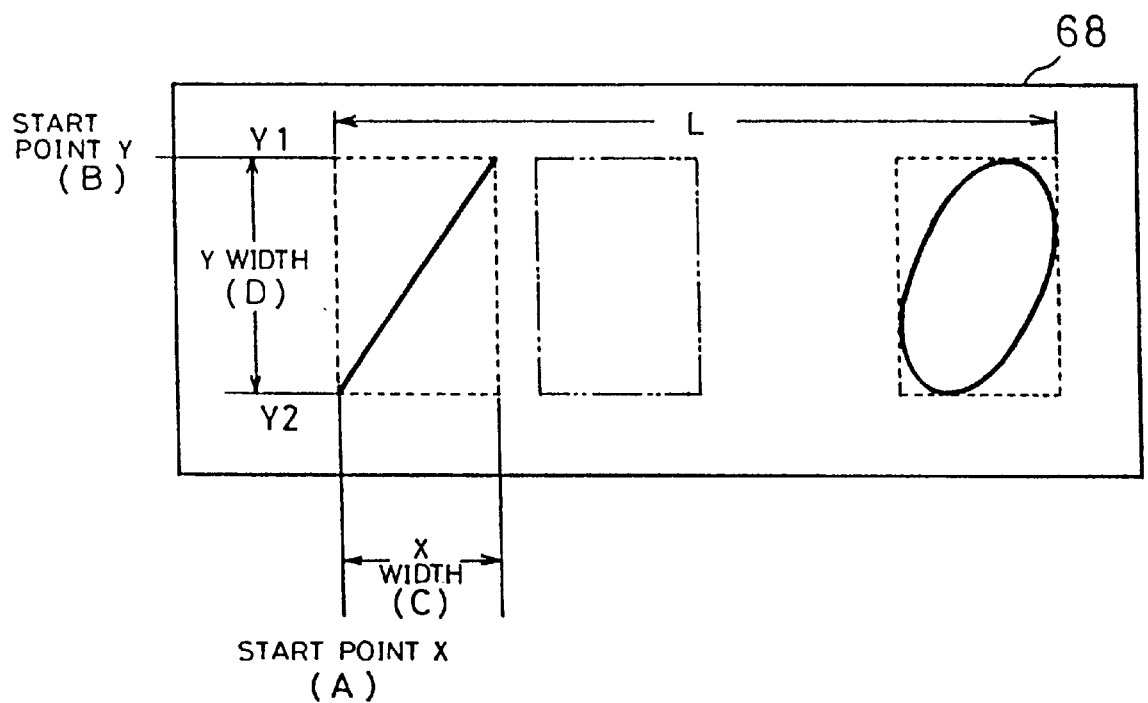

FIRST CHARACTER DATA TABLE 72

|  | 1ST STORAGE PORTION | 2ND STORAGE PORTION | 3RD STORAGE PORTION | 4-TH STORAGE PORTION | ... | 32ND STORAGE PORTION |
|---|---|---|---|---|---|---|
| X-START | A(1) | A(2) | A(3) | A(4) | ... | A(32) |
| Y-START | B(1) | B(2) | B(3) | B(4) | ... | B(32) |
| X-WIDTH | C(1) | C(2) | C(3) | C(4) | ... | C(32) |
| Y-WIDTH | D(1) | D(2) | D(3) | D(4) | ... | D(32) |

SECOND CHARACTER DATA TABLE 74

|  | 1ST STORAGE PORTION | 2ND STORAGE PORTION | 3RD STORAGE PORTION | 4-TH STORAGE PORTION | ... | 32ND STORAGE PORTION |
|---|---|---|---|---|---|---|
| X-START | A(1) | −1 | A(2) | A(3) | ... |  |
| Y-START | B(1) |  | B(2) | B(3) | ... |  |
| X-WIDTH | C(1) |  | C(2) | C(3) | ... |  |
| Y-WIDTH | D(1) |  | D(2) | D(3) | ... |  |

FACSIMILE APPARATUS CAPABLE OF RECOGNIZING HAND-WRITTEN ADDRESSING INFORMATION

BACKGROUND OF THE INVENTION

The present invention relates to a facsimile apparatus capable of recognizing hand-written addressing information. More specifically, the present invention relates to a facsimile apparatus in which the addressing information hand-written on a transmission original which is to be transmitted is read, and a calling operation is made on the basis of the addressing information as read.

DESCRIPTION OF THE PRIOR ART

For example, in Japanese Patent Application Laying-Open No. 1-175363 [H04N 1,32] laid-open on Jul. 11, 1989, there is disclosed a facsimile apparatus in which an address written on a transmission original which is to be transmitted is read, and then, the address as read is automatically dialed. In the prior art, a hand-writing space is formed at a predetermined position on the transmission original, and an addressing telephone number is hand-written into the space, and the hand-written addressing telephone number is read by a character recognition portion.

Furthermore, in Japanese Patent Application Laying-Open No. 3-38965 [H04N 1/32] laid-open on Feb. 20, 1991, there is disclosed a facsimile apparatus in which characters or a bar code indicating an addressing telephone number written at a head portion of a transmission original which is to be transmitted is scanned so as to read an image of the characters or the bar code, and an electrical signal is outputted according to the image, and then, the addressing telephone number is recognized on the basis of the electrical signal, and thereafter, the addressing telephone number as recognized is automatically dialed. In this prior art, the addressing telephone number is written at the head portion of the transmission original within a predetermined area.

Furthermore, in Japanese Patent Application laying-Open No. 4-140963 [H04N 1/32] laid-open on May 14, 1992, there is disclosed a facsimile apparatus in which an addressing telephone number is detected on the basis of image data between a first slice level and a second slice level, whereby the telephone number is automatically dialed. More specifically, in this prior art, a density level of a text of the original is made higher than the first slice level, and the addressing telephone number having a density level lower than the density level of the text is written into a blank at a lower portion of the original, or if the density level of the text and the addressing telephone number are equal to each other, by inserting a boundary line having a density level lower than the density level of the text between the text and the addressing telephone number, the text and the addressing telephone number are distinguished from each other, thereby to recognize the addressing telephone number.

Furthermore, in Japanese Patent Application Laying-Open No. 5-207256 [H04N 1/32] laid-open on Aug. 13, 1993, there is disclosed a facsimile apparatus in which a transmission original which is to be transmitted is laid below a cover sheet, and an addressing telephone number is written in a writing space formed at a predetermined position of the cover sheet, and the telephone number is automatically dialed by reading the telephone number.

Except the prior art described in Japanese Patent Application Laying-Open No. 4-140963, in the above described prior arts, it is necessary to write the telephone number at a predetermined position of the transmission original or the cover sheet. That is, in the prior arts, the addressing telephone number for automatic dialing is to be written in a position that is specified in advance. Furthermore, in the prior art described in Japanese Patent Application Laying-Open No. 4-140963, there is no positional restriction for writing the telephone number, but it is necessary to clearly differ the density level of the text and the telephone number or the density level of the text and the boundary line. That is, in all the prior arts, it was impossible to write addressing information at a free position with a free density level, and therefore, there were many conditions to be satisfied to implement an automatic dialing facsimile apparatus, and accordingly, all the prior arts have not been put into practical use.

SUMMARY OF THE INVENTION

Therefore, a principal object of the invention is to provide a novel facsimile apparatus capable of recognizing hand-written addressing information.

Another object of the present invention is to provide a facsimile apparatus capable of being put-into practical use by removing conditions in writing the addressing information as possible.

A further object of the present invention is to provide a facsimile apparatus in which the addressing information can be correctly recognized even if the addressing information is hand-written at a relatively free position.

A still further object of the present invention is to provide a facsimile apparatus capable of being put into practical use, in which the addressing information can be recognized with no error.

The other object of the present invention in which an operability is good and a calling operation can be performed according to the hand-written addressing information.

A facsimile apparatus according to the present invention comprises a transmission motor (90) for moving a transmission original in a sub-scanning direction; original reading means (100) for outputting image data of a black dot or a white dot by scanning each of lines of the sub-scanning direction in a main scanning direction; an area specifying means (60, S304–S313) for receiving the image data from the original reading means for specifying an area on the basis of a start line which is determined by a fact that a black dot is first detected and an end line which is determined by a fact that at least one write line in which no black dot is detected appears after the start line; an addressing information recognition means (60, S4, S5) for recognizing the addressing information on the basis of the image data outputted by the original reading means which reads the area specified by the area specifying means; and a calling means (60, 114, S6, S616) for performing a calling operation according to the addressing information recognized by the addressing information recognition means.

The transmission motor drives an original feeding roller so as to move the transmission original in the sub-scanning direction. During a time that the transmission original is moved in the sub-scanning direction, the original reading means scans the transmission original in the main scanning direction. The original reading means is a contact image sensor, for example, and outputs an electrical signal of the black dot or the white dot, i.e . . . the image data according to a density of the transmission original. The area specifying means specifies the area for the addressing information on the basis of the image data from the original reading means. More specifically, a line at which a black dot outputted from the original reading means first exists is regarded as the start line. If three white lines appears, for example, after the start line, the line is specified as the end line. Therefore, the addressing information recognition means recognizes the addressing information on the basis of the image data outputted from the original reading means which is reading the area specified by the start line and the end line. Then, the calling means automatically performs a procedure for calling according to the addressing information as recognized.

In accordance with the present invention, the area into which characters of the addressing information may be hand-written is specified by the area specifying means, and therefore, it is not necessary to designate in advance a writing position of the addressing information as different from the prior arts. Accordingly, an operator can hand-write the addressing information at a relatively free position, and therefore, the present invention is very effective in putting a facsimile apparatus capable of recognizing the hand-written addressing information into practical use.

Furthermore, in a facsimile apparatus in which an addressing telephone number or addressing information hand-written on an original is read to perform an automatic dialing, it is necessary to read the addressing telephone number or addressing information with accuracy such that the addressing telephone number or addressing information is recognized correctly.

Then, in another aspect of the present invention, a facsimile apparatus further comprises a first reading accuracy setting means (44) for variably setting a reading accuracy of the original reading means; and a second reading accuracy setting means (60, S303) for forcedly setting a specific reading accuracy in reading the addressing information by the original reading means irrespective of the reading accuracy set by the first reading accuracy setting means.

In the aspect, at a time that the addressing information is read by the original reading means, the second reading accuracy setting means forcedly sets the specific reading accuracy, e.g. a fine mode irrespective of the reading accuracy set by the first reading accuracy setting means (an image quality selection key, for example), e.g. a normal mode, a fine mode or a half tone mode. Then, the image data obtained by reading the addressing information by the original reading means with the specific reading accuracy is stored in a line buffer, and the addressing information recognition means recognizes the addressing information on the basis of the image data in the line buffer. Therefore, in reading the addressing information, the specific reading accuracy such as the fine mode is forcedly set, and therefore, the addressing information is not erroneously recognized, and accordingly, it is possible to obtain a very practical facsimile apparatus.

In another aspect of the present invention, a facsimile apparatus comprises a holding means for holding the image data outputted from the original reading means; a first order means for applying a first printing instruction; and a printing means for printing the image data held by the holding means in response to the first printing instruction. Therefore, in this aspect, the image data is printed-out, and accordingly, it is possible to confirm the hand-written addressing information without discharging the original from the facsimile apparatus, and therefore, it is possible to obtain a good operability.

Furthermore, a facsimile apparatus comprises a modem for a facsimile transmission; a handset for communication with voice; a connecting means for selectively connecting one of the modem and the handset to a telephone line; a detection means for detecting an off-hook state of the handset; and a control means for causing the connecting means to connect the handset to the telephone number and the calling means to perform a calling operation according to a recognition result at a time that the off-hook state is detected by the detection means. According to this embodiment, not only it is possible to perform automatic dialing for the facsimile transmission according to the addressing information hand-written on the facsimile original but also it is possible to perform dialing for the communication with voice according to the addressing information hand-written on the facsimile original only by bringing the handset into its off-hook state.

Furthermore, a facsimile apparatus according to an embodiment comprises a holding means for holding the image data outputted from the original reading means, and the addressing information recognition means includes a cut-out means for cutting-out image data for each character from the holding means, a pattern recognition means for pattern-recognizing the image data for each character cut-out by the cut-out means, and a result holding means for holding a recognition result for each character by the pattern recognition means, and a recognition judge means judges whether or not the addressing information is correctly recognized on the basis of the recognition result for each character held in the result holding means. Therefore, if there are many characters being not recognized in the addressing information hand-written on the transmission original, according to the judge of the recognition judge means, the holding means may be cleared and all the characters may be manually inputted. Furthermore, if there is a fewer characters being not recognized, it is possible to manually correct the characters. Therefore, it is possible to select a most suitable correction method according to the judge by the recognition judge means, and therefore, an operability becomes good.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a perspective view showing one embodiment according to the present invention;

FIG. 6 is an illustrative view showing storage areas of an SRAM shown in FIG. 3;

FIG. 8 is an illustrative view showing in detail a line buffer shown in FIG. 5;

FIG. 9 is an illustrative view showing a first character data table (a second character data table) shown in FIG. 6;

FIG. 10 is an illustrative view showing structure of a reading portion of the embodiment shown in FIG. 1;

FIG. 18 is an illustrative view showing respective data set in the first character data table (second character data table);

DETAILED DESCRIPTION OF THE PREFERRED EMBODIMENTS

Figure 2:
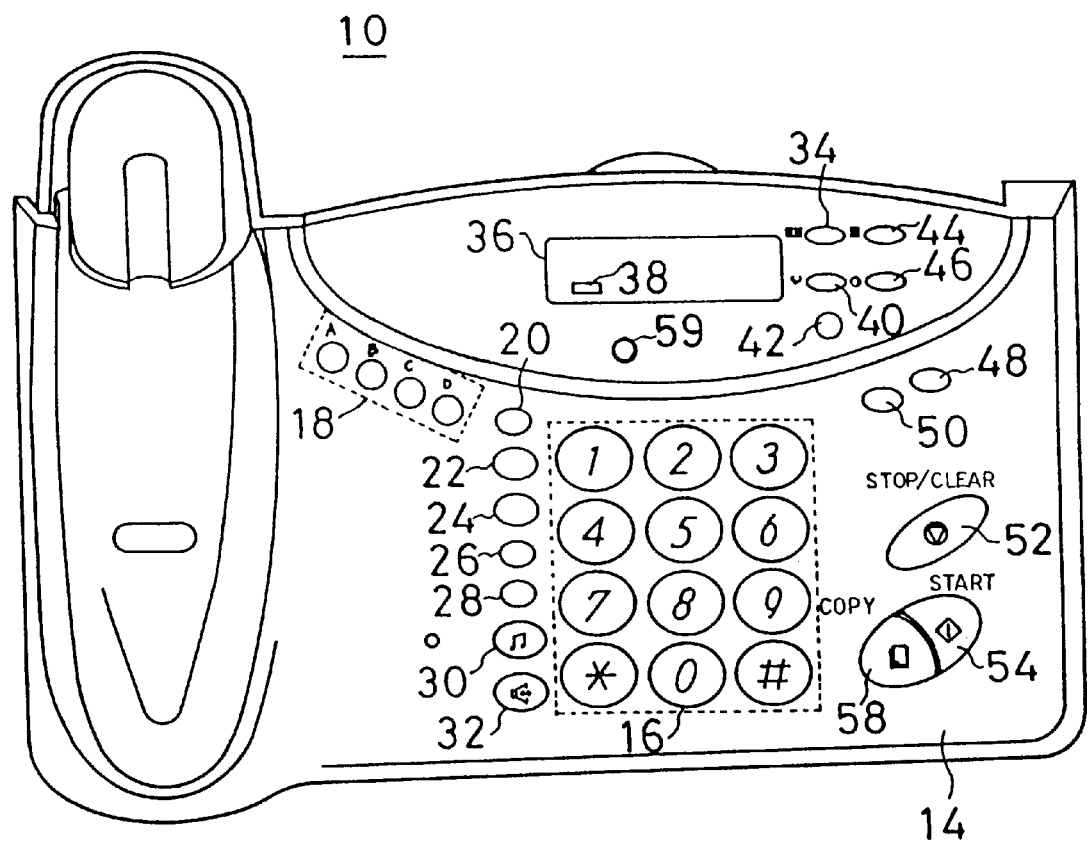
FIG. 2 is a perspective view showing in detail an operation panel of the embodiment shown in FIG. 1.

FIG. 1 is an appearance view showing one embodiment of a facsimile apparatus to which the present invention is applied. A facsimile apparatus 10 of this embodiment shown includes a housing 12, and on an upper surface of the housing 12, there is formed with an operation panel 14. In the operation panel 14, various kinds of keys shown in detail in FIG. 2 are arranged.

More specifically, on the operation panel 14, a ten key 16 including "0"–"9", "*" and "#" is provided, and the ten key 16 is utilized in manually entering addressing information as described later. Each of four keys indicated by "A"–"D" in FIG. 2 is a one touch dial key 18, and by depressing the same, it is possible to an address registered in advance can be automatically dialed. A shortening dial key 20 is utilized for inputting the addressing information with utilizing 2-digit code numbers registered in advance, and it is possible to enter a shortened code with utilizing the shortening key 20 and the ten key 16. A flash key 22 is a key for performing a so-called flashing operation, and if the flash key 22 is operated, an NCU (Network Control Unit, described later) 114 breaks a telephone line for 700 milliseconds–1 second. A tone key 24 is a key for changing-over a dial pulse signal or a DPMF (Dual-tone Multi-frequency) signal. A pause key 26 is utilized for setting a dial pause period. A re-dial key 28 is utilized for dialing again the address by which a calling operation has been performed once but the telephone line was not connected. In addition, reference numerals 30 and 32 denote a reservation key and a hands-free key, respectively.

A menu key 34 is provided above the ten key 16 in FIG. 2, and the menu key 34 operates as a function selection key. That is, by depressing the menu key 34, it is possible to select a menu for setting various kinds of functions. In addition, as described later, the menu key 34 is also utilized as a key for moving a cursor 38 toward an upper column direction, i.e. a left direction in an LCD (Liquid Crystal Display) 36. A set key 40 is a key for settling the function set by the menu key 34. Furthermore, the set key 40 is also utilized for moving the cursor 34 toward a lower column direction, i.e., a right direction in the LCD 36. A mode key 42 is a key for changing-over a fax mode, a telephone mode or an automatic answering telephone mode. A quality selection key 44 selects one of a normal transmission mode, a fine transmission mode and a half tone transmission mode.

An original kind key 46 is utilized for changing light and shade of the original or for selecting a half tone. A dial bank key 48 is utilized for reading-out addressing information stored in an SRAM 76 (described later). More specifically, if the addressing information is manually inputted with utilizing the ten key 16, for example, the addressing information is registered in the SRAM 76 at every time. By operating the dial bank key 48, it is possible to read-out the addressing information of a first place to a twenty place in an order of a frequency of a dialing operation in the past. Thus, by reading-out the addressing information by the dial bank key 48, it is possible to utilize the addressing information in a one touch dial registration or a shortened dial registration. Furthermore, with utilizing the dial bank key, by reading-out the addressing information which has been dialed, it is possible to implement a function as a so-called automatic dialer. A paper saving key 50 is utilized for saving a facsimile paper in receiving a facsimile transmission, and if the paper saving key 50 is depressed, a feeding pitch of the facsimile paper is made half.

A stop/clear key 52 plays a function for stopping an operation being executed, a function for clearing a number inputted in a registration mode (one touch registration or a registration of a name/number of own facsimile apparatus), and a function for releasing its registration mode. Furthermore, the stop/clear key 52 is operated in a recognition operation of the addressing information as described later. For example, after the original is inserted as shown in FIG. 10, if the stop/clear key 52 is operated until an operation for recognizing the addressing information is started, the original is forcedly discharged. Furthermore, during a time that the addressing information of the original as inserted is recognized (message of "NUMBER IS BEING READ" is displayed on the LCD 36), if the stop/clear key 52 is operated, the recognition operation of the addressing information is suspended, and a recognition result is canceled. However, in such a case, image data read by a CIS 100 (described later) is held in a line buffer 68 (described later). Furthermore, if the stop/clear key 52 is operated in a modification mode or an error correction mode, the apparatus is forcedly returned to a waiting state.

A start key 54 is operated at a time that an operation is to be started. For example, in a state where a handset 56 shown in FIG. 1 is brought into an off-hook state, or when a hand-free key 32 is turned-on, if the start key 54 is operated, a transmission operation is started in response to the insertion of the original, or a reception operation is started when no original is inserted. Furthermore, at a time of an on-hook state of the handset 56, if the addressing information is manually inputted, a dialing operation is started in response to the operation of the start key 54. Furthermore, after the addressing information hand-written on the transmission original is recognized, if the start key 54 is operated, a dialing operation according to the addressing information as recognized is started.

A copy key 58 is operated in executing a copying operation of the original. A hand-writing key 59 is a key for changing-over an automatic recognition mode wherein the addressing information hand-written on the transmission original is read and the dialing operation is automatically started on the basis of a recognition result of the addressing information or a manually input mode wherein the addressing information is manually inputted. The hand-writing key 59 incorporates an LED 152, for example, and the LED 152 is lightened at a time that the automatic recognition mode is set, and the LED 152 is turned-on and off at a time that the addressing information is read and recognized in the automatic recognition mode. Furthermore, if the hand-writing key 59 is operated until the dialing operation is performed after the addressing information is read in the automatic recognition mode, the image data of the addressing information stored in the line buffer 68 is printed-out. Furthermore, if the hand-writing key 59 is operated after the manually input mode has been set during the operation of the automatic recognition mode, the manually input mode is transited to the automatic recognition mode.

Figure 3:
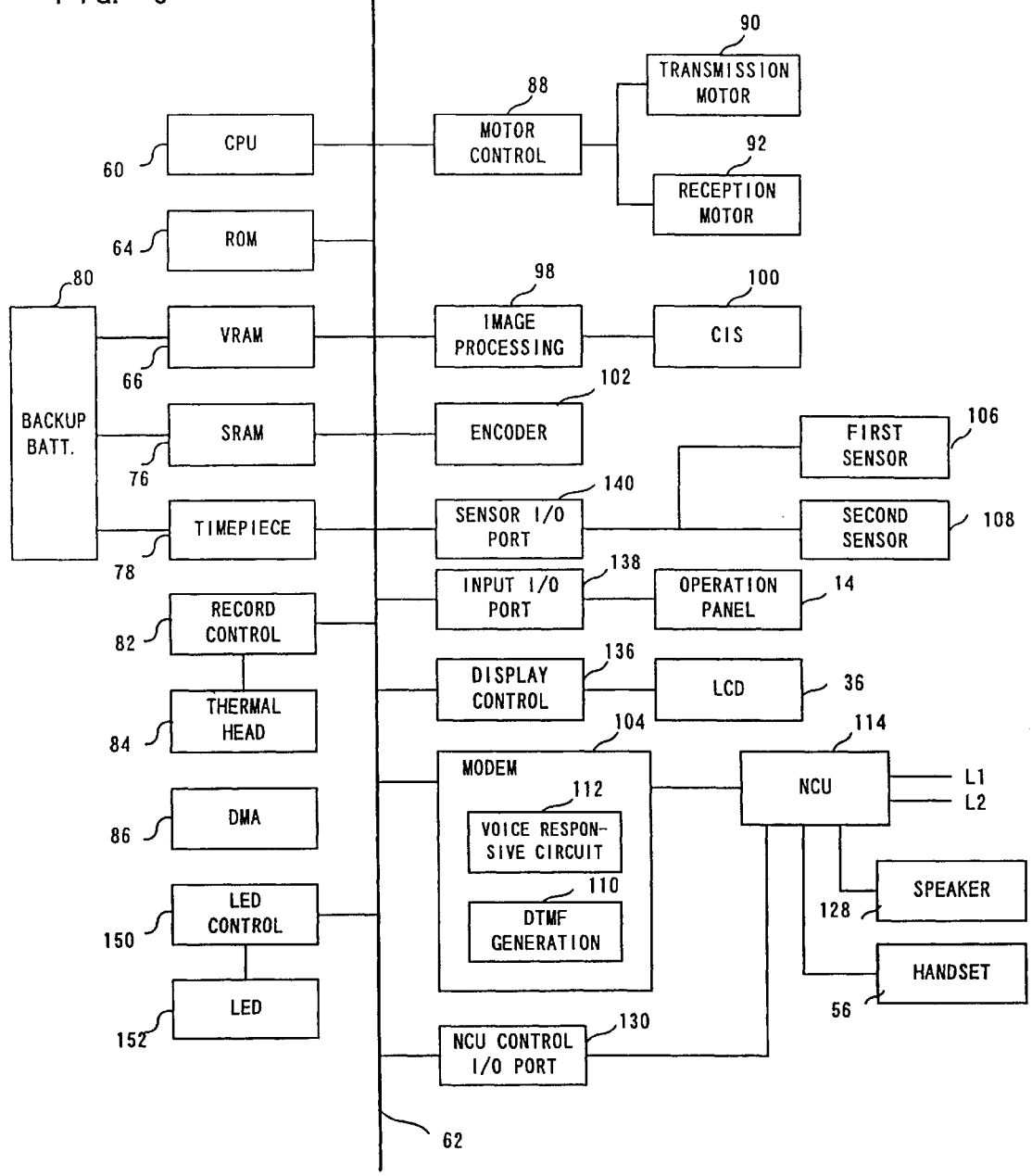
FIG. 3 is a block diagram showing whole structure of the embodiment shown in FIG. 1.
Figure 4:
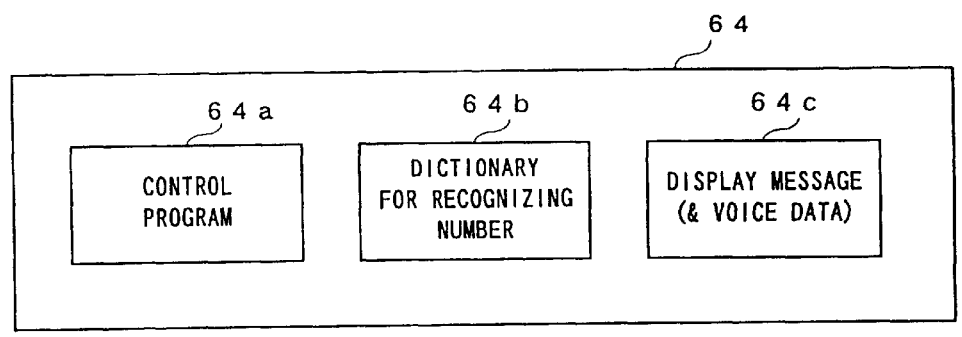
FIG. 4 is an illustrative view showing storage areas of a ROM shown in FIG. 3.
Figure 5:
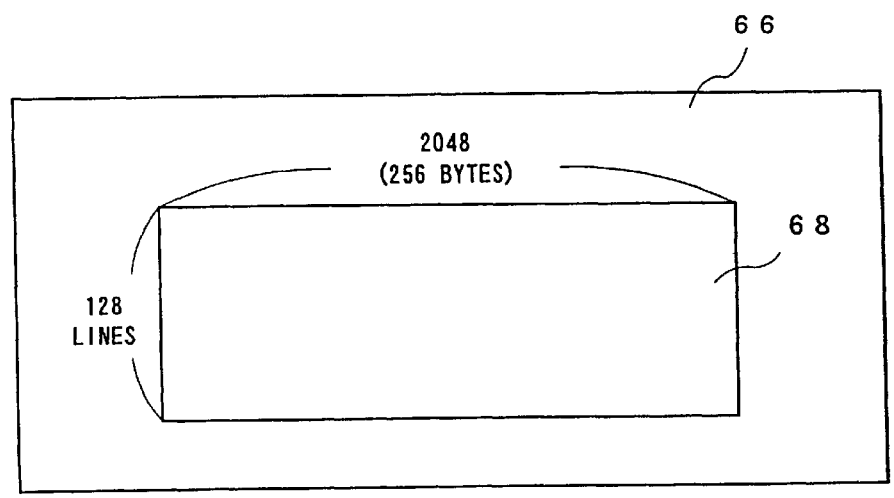
FIG. 5 is an illustrative view showing storage areas of a VRAM shown in FIG. 3.

FIG. 3 is a block diagram of FIG. 1 embodiment including a single-chip facsimile processor such as "TC35167F" manufactured by Toshiba, for example. A CPU 60 and other components are coupled to each other through a bus 62. As shown in FIG. 4, a ROM 64 includes a control program area 64a, a recognition dictionary area 64b and a message data area 64c wherein data for message (an audible message or a visible message), i.e. message data. The control program area 64a includes a control program according to flowcharts described later. The recognition dictionary area 64b is a dictionary for recognizing the hand-written addressing information, and includes vectors and a plurality of neural networks for a pattern matching. By selecting a neural network according to a vector of the pattern matching, the addressing information hand-written on the transmission original can be recognized. The recognition dictionary area 64b further includes a 256 table (a bit number detection table). The bit number detection table is a table indicating the number of the black dots in 1 byte, and referred to in detecting the number of the bits at a time that a histogram is to be produced.

A VRAM 66 includes the line buffer 68 of a bit-map system (accessible bit by bit) of 32.25 K byte (=129×2048 bits=256 bytes), for example.

On the other hand, the SRAM 76 is a memory of a byte-map system (accessible byte by byte), and includes a memory switch area 76a, a flag area 76b and a counter, pointer and variable area 76c, and a dial buffer 70, a first character table (TBL1) 72 and a second character table (TBL2) 74 as shown in FIG. 6.

An error processing mode switch EMODE in the memory switch area 76a is a switch for selecting or setting a processing that a rejected character occurs at a time that the hand-written addressing information is recognized. If the switch EMODE is set as "0", when the rejected character (unrecognizable character) occurs in recognizing the hand-written addressing information, the recognition operation is suspended, and a recognition result obtained by that time is canceled. Furthermore, if the error processing mode switch EMODE is set as "1", the recognition operation is suspended at every time that the rejected character occurs and a mode is transited to an error correction mode. Furthermore, if the switch EMODE is set as "2", a mode is transited to the error correction mode at a time that the recognition operations for all the characters of the hand-written information are completed.

A recognition confirmation time switch CT is a switch for setting a time for confirming the recognition result after the recognition operation of the hand-written addressing information is terminated. More specifically, if the switch CT is set as "0", after the recognition result of the hand-written addressing information is displayed on the LCD 32 (FIG. 2), the automatic dialing operation is started in response to the operation of the start key 54 (FIG. 2). However, a variable numeral of "1" to "10" is set in the switch CT, after the recognition result is displayed, the dialing operation is automatically performed after seconds indicated by the variable numeral (CT seconds).

A number transmission mode switch NSMODE is a switch for selecting whether or not the image data read by the CIS 100 to recognize the hand-written addressing information is to be transmitted as a portion of transmission data. If the switch NSMODE is set as "0", the image data read for recognizing the addressing information is not transmitted as a portion of the transmission data. If the switch NSMODE is set as "1", the image data read for recognizing the addressing information is transmitted as a portion of the transmission data.

A read transmission mode switch SMODE is a switch for setting a transmission mode desired by an operator, and SMODE="0" indicates a normal mode, SMODE="1" is a fine mode, and SMODE="2" indicates a half tone mode.

In the flag area 76b, there are formed with an automatic recognition flag RF, an entry guide flag GF, a confirmation print flag CPF, an automatic recognition transition flag CAF, a pre-read flag SF, a valid image area flag AF, a valid character flag MF and an error flag EF. The automatic recognition flag RF indicates which one of the automatic recognition mode and the manually input mode is selected by the operator, and the manually input mode is selected at a time of RF="0" and the automatic recognition mode is selected at a time of RF="1". The entry guide flag GF indicates whether or not the guide representative of a writing method of the addressing information on the transmission original which is read in the automatic recognition mode is to be printed-out, and a print output of the entry guide is inhibited at a time of GF=0 and the print output is permitted at a time of GF="1". The confirmation print flag CPF indicates whether or not the image data of the addressing information being stored in the line buffer 68 is to be automatically printed-out (hereinafter called as "confirmation print") at a time that the automatic recognition mode is transited to the manually input mode in response to the stop/clear key 52, and the confirmation print is permitted at a time of CPF="0" and the confirmation print is inhibited at time of CPF="1". The automatic recognition transition flag CAF indicates right or wrong of transition from a manually input mode to the automatic recognition mode, and the transition is permitted at a time of CAF="0" and inhibited at a time of CAF="1". The pre-read flag SF is a flag indicating whether or not data of the addressing information which has been recognized exists in the dial buffer 70, and SF="0" indicates that there is no data, and SF="1"indicates that there is the data. The valid image area flag AF is a flag indicating whether or not an area of the original being read by the CIS 100 is an area in which an addressing information that is a target for recognition is hand-written, and AF="0" indicates an area other than the addressing information area, and AF="1" indicates the addressing information area. The valid character flag MF is a flag which indicates whether or not the area of the addressing information that is a target for recognition is scanned in the main scanning detection, and MF="0" indicates an outside of the area and MF="1"

indicates an inside of the area. The error flag EF indicates that the rejected character occurs at a time that the addressing information is recognized, and EF="0" indicates that no rejected character occurs, and EF="1" indicates occurrence of the rejected character.

In the counter, pointer and variable area 76c of the SRAM 76, there are formed with an original feed counter PCNT, write line counter LCNT, valid line counter BCNT, white line counter WCNT, 1st to 2048-th column counter CCNT, a character number counter MCNT, a column pointer CPNT, a first character data counter DCNT1, a second character data counter DCNT2, a dial buffer write pointer DLBW, a second table read pointer TRPT, a white line transmission counter WLSC, a line buffer read pointer LBRP, a space counter SCNT, a timer counter TC, a rejected character number counter RJC, an average distance register AL and a space width register SP. The paper feed counter PCNT is a counter for counting the number of the lines in the sub-scanning direction of the original, which are read by the CIS 100 for recognizing the addressing information. The write line counter LCNT is a write pointer for writing the image data read by the CIS 100 for recognizing the addressing information into the line buffer 68. The valid line counter BCNT is a counter for counting the number of times that lines in each of which there are two or more successive black dots in the main scanning direction (valid line) successively appear. The white line counter WCNT is a counter for counting the number of times that lines in each of which there are not two or more successive black dots in the main scanning direction (white line) successively appear.

The 1st to 2048-th column counter CCNT is a counter for counting the number of the black dots for each of the columns in the line buffer 68 shown in detail in FIG. 8, and includes a first column counter 1CCNT, a second column counter 2CCNT, a third column counter 3CCNT, . . . , a 2048-th column counter 2048 CCNT. The character number counter NCNT is a counter for counting the number of the characters included in the image data stored in the line buffer 68. The column pointer CPNT is a pointer for addressing respective columns of the line buffer 68. The first data counter DCNT1 is a read pointer for reading-out the data in the first character data table 72 (FIG. 6) and the second data counter DCNT2 is a write pointer for writing the data into the second character data table 74 (FIG. 6).

The dial buffer write pointer DLBW is a write point for writing a character code of the addressing information in the dial buffer 70. The second table read pointer TRPT is a read pointer for reading-out the data of the second character data table 74. The white line transmission counter WLSC is a counter for counting the number of the white lines to be transmitted. The line buffer read pointer LBRP is a read pointer for reading-out the image data stored in the line buffer 68 for each line. The space counter SCNT is a counter for counting the number of times that spaces included in the hand-written addressing information successively appear. The timer counter TC is a counter for counting a time. The reject character number counter RJC is a register for storing the number of the rejected characters in the recognition result. The average distance register AL is a register in which data indicative of an average distance AL between the characters of the image data stored in the line buffer 68 is stored, and the space width register SP is a register in which the data representative of a space width SPC between the characters of the image data in the line buffer 68 is stored.

The dial buffer 70 is a buffer memory for storing a character code by which a dial pulse or a DTMF signal is generated from the NCU114 on the basis of the recognition result of the addressing information hand-written on the original or the addressing information manually inputted.

Each of the first character table 72 and the second character table 74 is a character data table having storage portions of 32 in total of a first storage portion to a 32nd storage portion for each of a start X area, a start Y area, an X width area and a Y width area as shown in FIG. 9. In the character data tables 72 and 74, the above described four data indicative of an area of each character in the line buffer 68 are stored. The character data tables 72 and 74 are utilized for cutting-out respective characters or spaces in the addressing information.

In addition, the SRAM 76 includes an image buffer and a histogram buffer necessary to recognize the hand-written addressing information. The image buffer stores the image data from the line buffer 68 in a byte-map fashion, and formed as an area of 256 byte. The histogram buffer is formed as an area of 1×512 byte, and utilized for producing the histogram necessary for recognizing the hand-written addressing information.

Returning back to FIG. 3, a time piece circuit 78 is a circuit for counting a current time in response to a clock signal (not shown), and backed-up together with the VRAM 66 and the SRAM 76 by a back-up battery 80.

A record control circuit 82 is a circuit for printing-out the data on the facsimile paper in a confirmation print operation, a facsimile reception operation or a copying operation, and includes a thermal head driver for thermal head 84.

A DMA circuit 86 is a circuit for controlling a direct memory access operation by which the data is read from the line buffer 68 or the data is written in the line buffer 68 without a control of the CPU 60.

A motor control circuit 88 controls a transmission motor 90 and a reception motor 92. The transmission motor 90 and the reception motor 92 are stepping motors. The transmission motor 90 drives an original feed roller 94 and a pressure roller 96 shown in FIG. 10. The reception motor 92 feeds the facsimile paper or recording paper (not shown). An image processing circuit 98 includes a half tone processing circuit which receives the bit image data outputted from the CIS 100 as "1" or "0". In addition, in the half tone processing circuit, a slice level of the CIS 100 is changed according to a dither method, for example.

A code circuit 102 converts the data of one line from the CIS 100 into a modified Haffinann code which is then applied to the SRAM 76. Accordingly, in the SRAM 76, the MH code of the data for one line from the CIS 100 is stored for each line. Then, the MH code to which a fill code is added by the CPU 60 is supplied to a modem 104 in a FIFO system.

In addition, a first original sensor 106 and a second original sensor 108 are arranged at positions sandwiching the original feed roller 94 as shown in FIG. 10. The first original sensor 106 detects a fact that the original is fed to a position of the original feed roller 94, i.e. presence of the original. The second original sensor 108 detects a fact that the original is fed to a position of the CIS 100, that is, a fact that the original reaches a read position. The sensors 106 and 108 are connected to the bus 62 via a sensor I/O port 140.

The modem 104 includes a DTMF generation circuit 110 which outputs the DTMF signal in a mode according to a designation by the CPU 60. The modem 104 further includes a voice responsive circuit 112 which returns voice data such as "wait a moment", for example according to the data of the message data area 64c (FIG. 4) to a calling party at a time that telephone lines L1 and L2 are caught by the NCU 114.

In addition, the modem 104, of course, includes a modulation/demodulation circuit.

Figure 11:
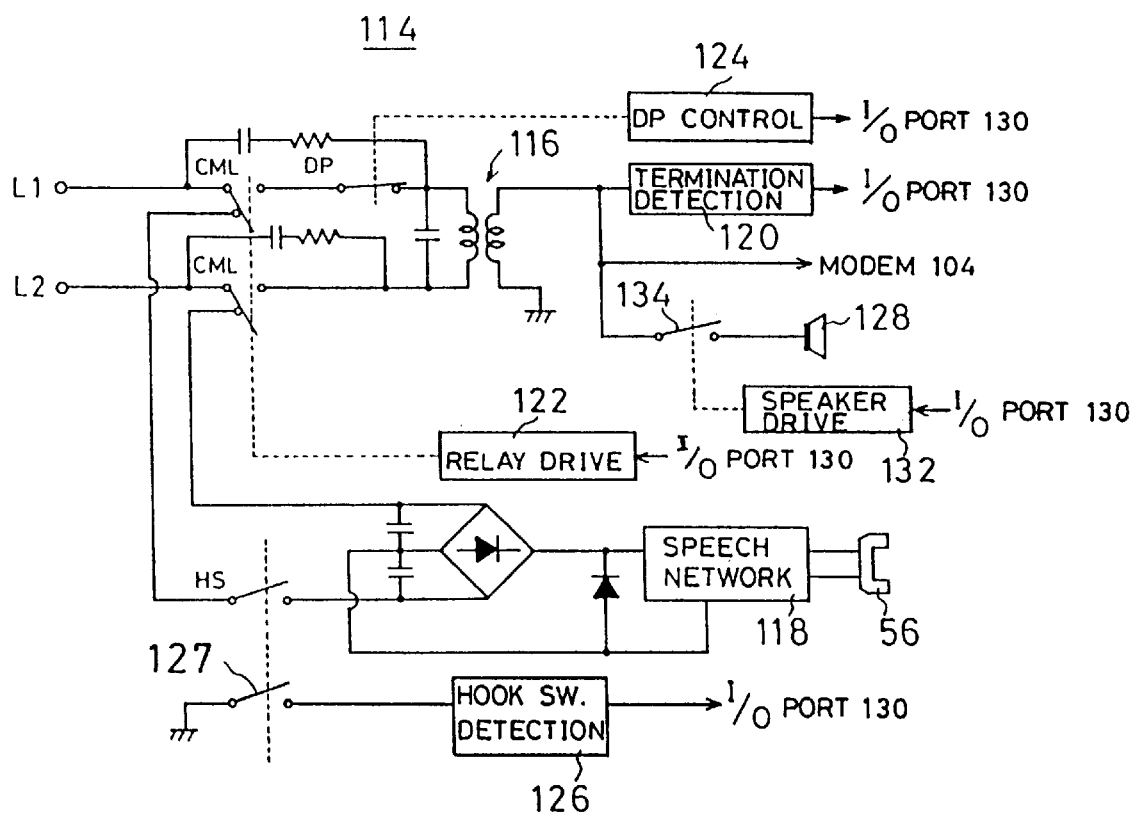
FIG. 11 is a block diagram showing in detail an NCU shown in FIG. 3.

The NCU 114 is shown in detail in FIG. 11. With referring to FIG. 11, the telephone lines L1 and L2 are connected to a transformer 116 via CML switch. Therefore, the CML switch changes-over that the telephone lines L1 and 12 are connected to the modem 104 via the transformer 114 or that the telephone lines L1 and L2 are connected to the handset 56 via a speech network 118.

In the waiting state, the CML switch is switched to a side of the handset 56, and when a ringer signal (16 Hz) is outputted from the telephone lines L1 and L2, the ringer signal is applied to the transformer 116 through a capacitor and a resistor. Therefore, a termination detection circuit 120 detects the ringer signal, and notifies the termination to the CPU 60 via an NCU control I/O port 130.

When the termination signal from the termination detection circuit 120 is applied to the CPU 60, the CPU 60 switches the CML switch to a side of the transformer 116 via a delay drive circuit 122. In response thereto, a line of the modem 104—the transformer 116—the CML switch—L1 and L2 is formed, and then, the above described "voice response" is performed, or a facsimile identification signal from the calling party, that is, a CNG signal (1100 Hz; 0.5 seconds on and 3 seconds off) is detected. Therefore, NCU 114 returns a facsimile signal (NSF, CSD and DIS, for example) to the calling party. If the facsimile signal is received by the calling party, the calling party returns a signal of NSS (or TSI), for example, and confirmation of functions are performed between two facsimile apparatus. Thereafter, a training mode is executed, and confirmation of functions of the modem 104 is performed. That is, the data is first transmitted at 9600 Baud, and then, data are sequentially transmitted at 7200 Baud, 4800 Baud and 2400 Baud so that a communication speed at which data can be transmitted and received between the two facsimile apparatus is set. Then, the NCU 114 returns a CFR signal to the calling party, and a fax image signal is sent from the calling party via the telephone lines L1 and L2.

In addition, the above described signals (NSF, CSI, DIS, . . . , CFR and etc. ) are constructed by the CPU 60, and thereafter, the CPU 60 orders the modem 104 to transmit the signals.

At a time of a facsimile transmission, if the addressing information is inputted by the ten key 16 (FIG. 2), for example, and when the start key 54 is operated, the CML switch is switched to the side of the transformer 116, i.e. the side of the modem 104 by the CPU 60. Thereafter, during 3 seconds, capture of the telephone line is confirmed. Then, the CPU 60 applies a signal to a DP control circuit 124 in response to the confirmation of the settlement of the telephone line. Accordingly, a calling signal is applied to the telephone lines L1 and L2 by turning-on or off a DP switch by the DP control circuit 124 according to the character code stored on the dial buffer 70 (FIG. 6). Succeedingly, in response to the instruction of the CPU 60, the CNG signal is outputted from the modem 104 via the transformer 116 and the telephone lines L1 and L2. Thereafter, an operation in reverse to the above described facsimile reception operation is performed.

Furthermore, in a case of a telephone calling, if the handset 56 is picked-up, a hook switch HS is turned-on. Therefore, the tone signal from the telephone lines L1 and L2 is heard at the handset 56 via the CML switch. On the other hand, a hook switch detection circuit 126 detects such an on-hook state, and applies an on-hook signal to the CPU 60. In response to the on-hook signal, CPU 60 switches the CML switch to the side of the transformer 116 under a condition that the addressing information is inputted and the hook switch HS is turned-on. Therefore, the DP control circuit 124 controls the DP switch to be turned-on or off, thereby to perform a calling operation. Thereafter, under a condition that no key is depressed for a predetermined time period, the CML switch is switched to a side of the hook switch HS such that the communication with voice utilizing the handset 56 becomes possible. There is provided with a switch 127 moved together with the hook switch HS, and the hook switch detection circuit 126 can detect the on-hook state or off-hook state by detecting on or off of the switch 127.

In addition, detailed structure of such the NCU 114 and an operation thereof is well-known, and not important for the present invention, and therefore, a detailed description of the NCU 114 will be omitted here. In addition, a speaker 128 shown in FIG. 11 is provided on a side surface of the housing 12 as shown in FIG. 1, and when the switch 134 is turned-on by a speaker drive circuit 132 in response to a signal from the NCU control I/O port 130, it is possible to output the voice message from the speaker 128.

Returning back to FIG. 3, an LED control circuit 150 controls on or off of the LED 152 incorporated in the hand-writing key 59 under a control of the CPU 60.

Next, with referring to flowcharts of FIG. 12 and thereafter, an operation of the above described embodiment will be described.

Figure 12:
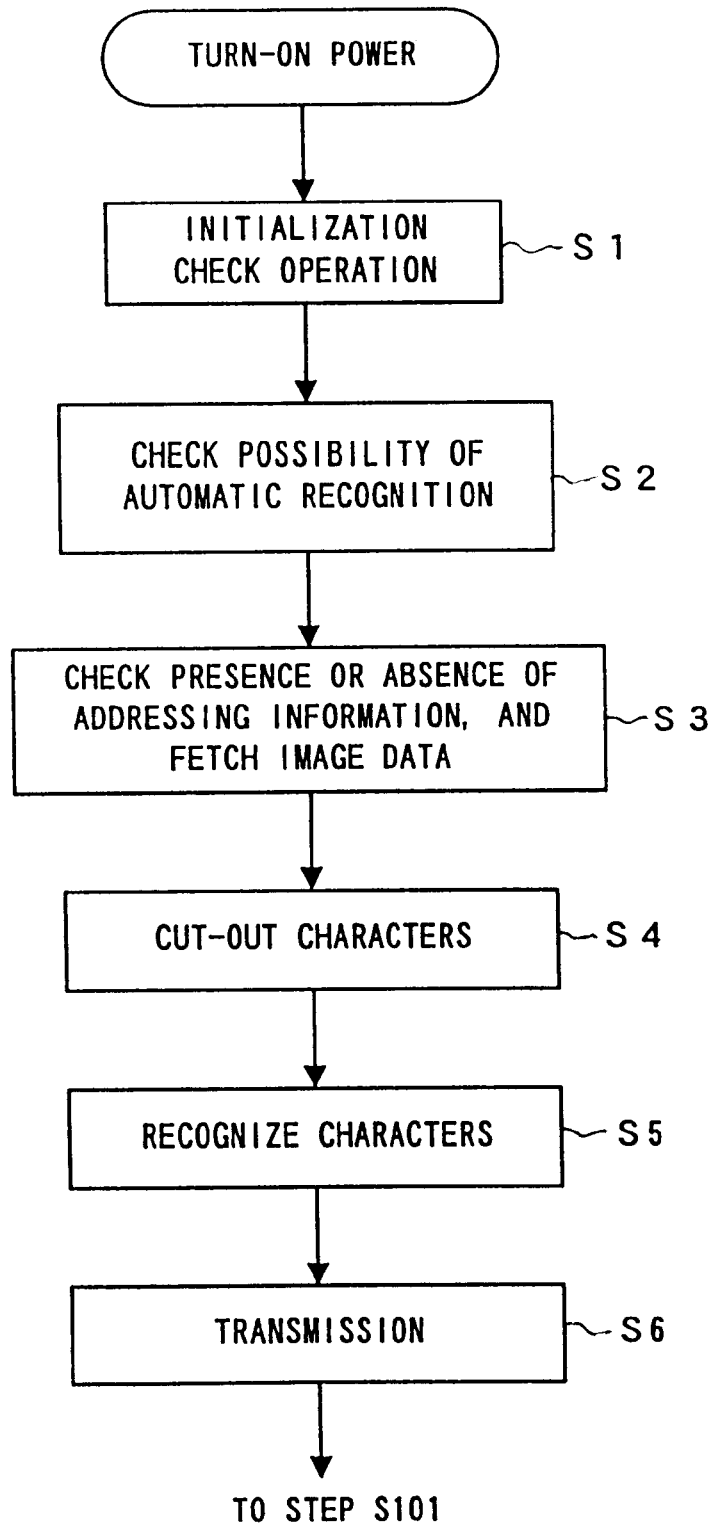
FIG. 12 is a schematic flowchart showing a whole operation of the embodiment.

FIG. 12 is a flowchart showing a schematic operation. When a power switch (not shown) is turned-on, in a first step S1, the CPU 60 executes initialization, and checks operations of the respective keys on the operation panel 14. In a next step S2, the CPU 60 checks whether or not the addressing information hand-written on the transmission original is to be automatically recognized. Therefore, in a case where it is determined that the addressing information is to be recognized in the step S2, in a next step S3, the presence or absence of the addressing information on the transmission original is checked, and when the addressing information is hand-written on the transmission original, the image data of the addressing information is fetched into the line buffer 68. Then, in a step S4, pattern data of each character of the hand-written addressing information is cut-out, and in a step S5, the character as cut-out is recognized. In a step S6, a transmission process is executed according to the addressing information recognized in the step S5.

Figure 13:
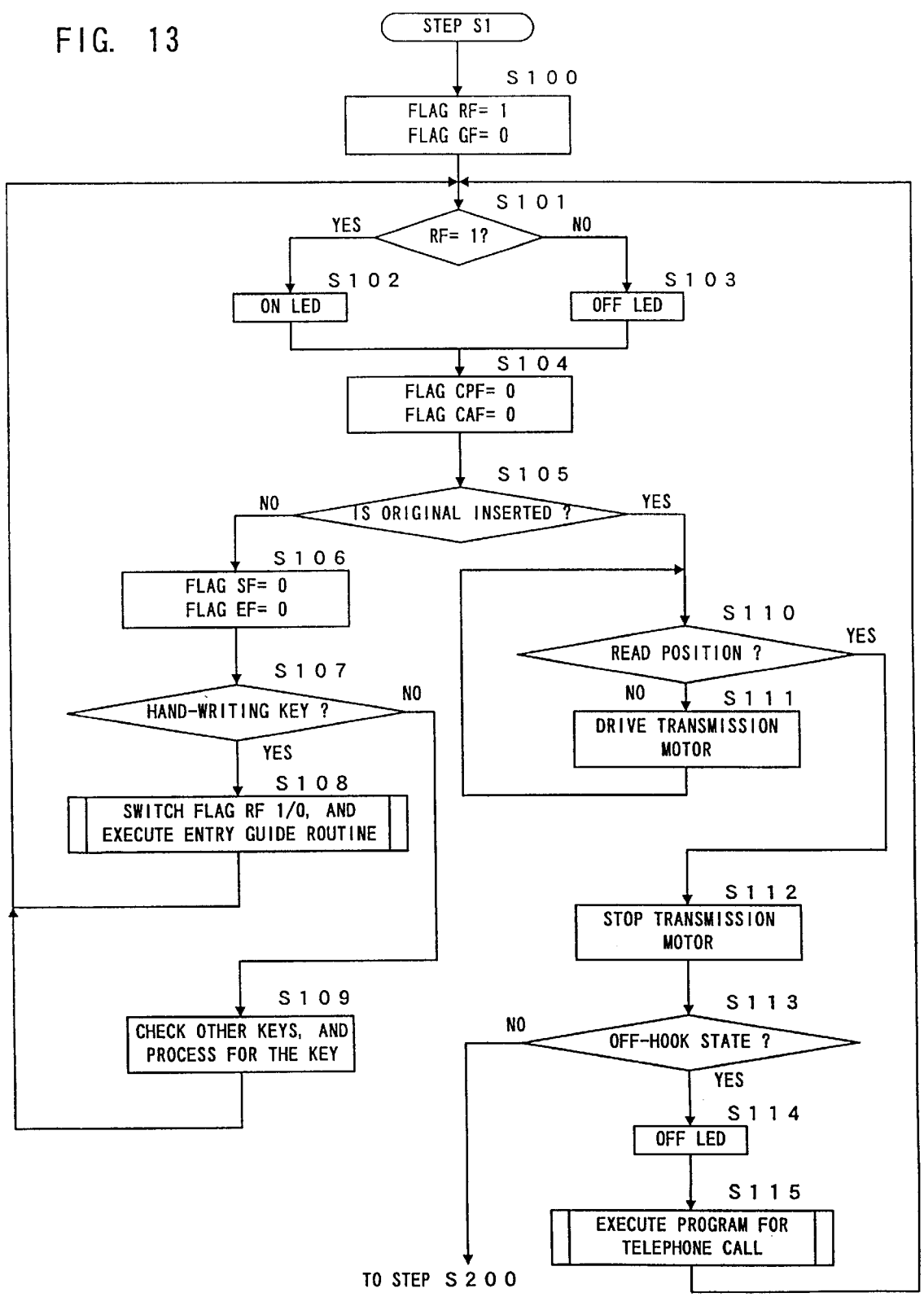
FIG. 13 is a flowchart showing operations for initialization and for operation check.

The first step S1 of FIG. 12 is shown in detail in FIG. 13. In a first step S100 in FIG. 13, the CPU 60 sets the automatic recognition flag RF and the entry guide flag GF in the flag area 76b of the SRAM 76 as "0" and "1", respectively. In a succeeding step S101, it is determined whether or not RF=1, and in a step S102, the LED 152 is turned-on. If it is determined that RF=0, in a step S103, the LED 152 is turned-off. Thus, in the steps S101–S103, only when RF=1, that is, the automatic recognition mode is selected, the CPU 60 drives the LED control circuit 150 to lighten the LED 152.

In a step S104, the CPU 60 sets the confirmation print flag CPF and the automatic recognition transition flag CAF in the flag area 76b of the SRAM 76 as "0 " and "0", respectively. In a succeeding step S105, the CPU 60 determines whether or not the original is inserted. That is, in the step S105, the CPU 60 determines whether or not the detection signal from the first original sensor 106 (FIG. 10) exists. When no original insertion detection signal is obtained from the first original sensor 106, in a step S106, the CPU 60 clears the pre-read flag SF and the error flag EF, respectively. Then, in a next step S107, it is determined whether or not the hand-writing key 59 in the operation panel 14 is operated. If not operated, in a step S108, operations of other keys are checked, and a process according to a key being operated is executed. For example, setting of the memory switches in the memory switch area 76a shown in FIG. 6, or one touch dial registration or shortening dial registration may be performed. If the processing of the step S108 is completed, the process returns to the step S101.

Figure 7:
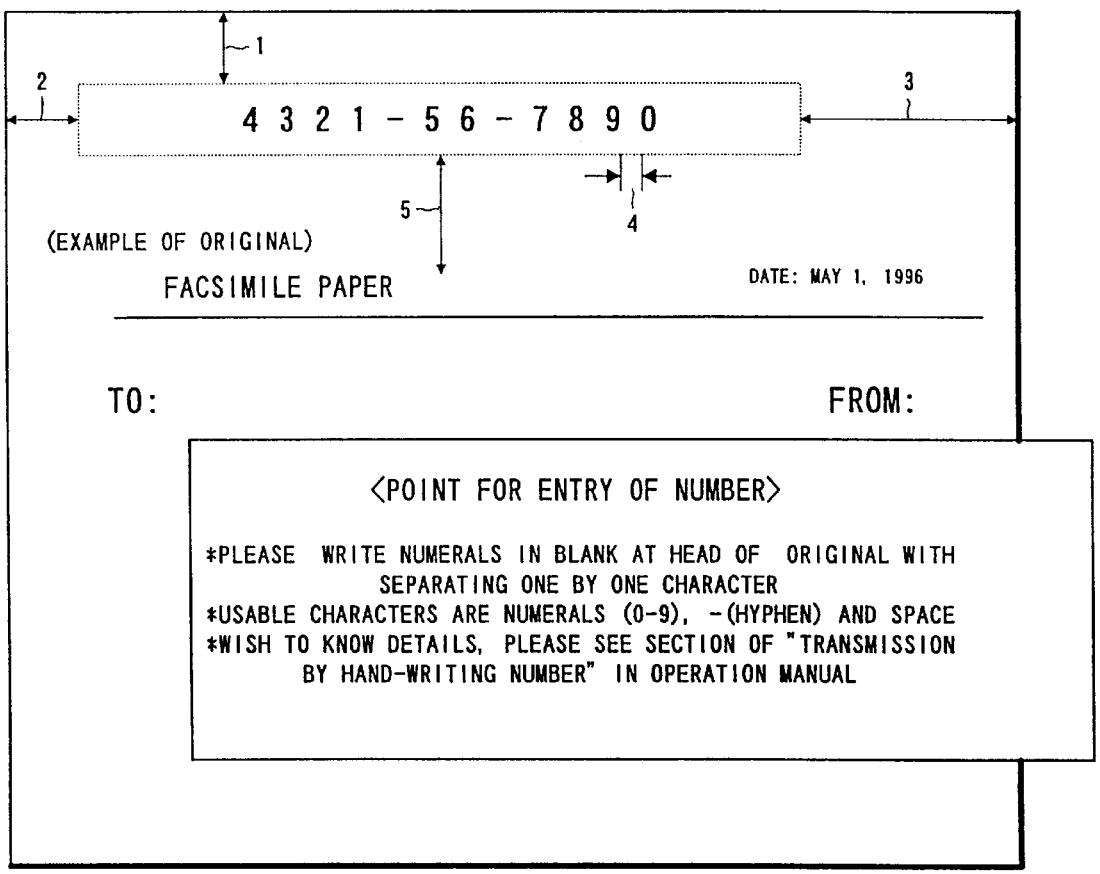
FIG. 7 is an illustrative view showing in detail an entry guide of the embodiment shown in FIG. 1.
Figure 14:
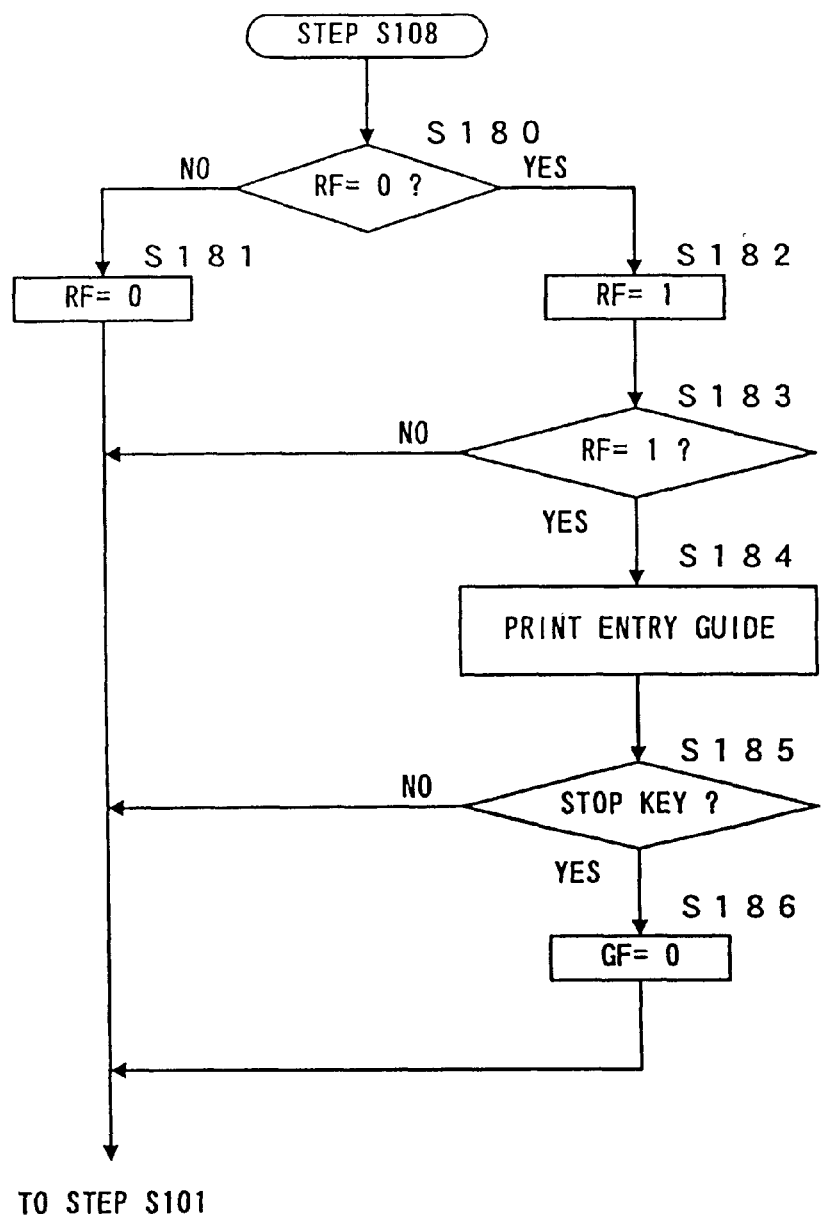
FIG. 14 is a flowchart showing operations for automatic recognition change-over and for print of the entry guide.

On the other hand, if it is determined that the hand-writing key 59 is operated in the step S107, a process of a step S180 shown in detail in FIG. 14 is executed by the CPU 60. More specifically, in a step S180, it is determined whether or not the automatic recognition flag RF is "0", and if not "0", in a step S181, the process returns to the step S101 after the flag RF is changed to "0". Furthermore, if it is determined that the flag RF is "0" in the step S180, the CPU 60 determines whether or not the entry guide flag GF is "1" in a step S183 after the CPU 60 sets the flag as "1" in a step S182, and if the flag is not "1", the process is directly returned to the step S101. On the other hand, if the flag GF is "1", in a step S184, the entry guide shown in FIG. 7 is printed-out. More specifically, in the step S184, the CPU 60 reads-out the image data of the entry guide stored in advance in the ROM 64, and applies the image data to the record control circuit 82, whereby the entry guide shown in FIG. 7 can be printed-out on the recording paper or facsimile paper. In a next step S185, CPU 60 determines whether or not the stop key 52 in the operation panel 14 is operated in executing the step S184. If the stop key 52 is operated, in a step S186, the entry guide flag GF is reset as "0", and thereafter, the process is returned to the step S101.

More specifically, after the power on, if the hand-writing key 59 is operated in a state where no original is inserted, in response to the operation of the hand-writing key 59, the automatic recognition flag RF is set and reset, and therefore, the LED 152 is repeatedly turned-on and off. Furthermore, if the entry guide flag GF is "1" at a time that the automatic recognition flag RF is changed from "0" to "1", the entry guide is printed-out at every timing of the change of the flag RF. Furthermore, if the stop key 52 is operated during the printing operation of the entry guide, the entry guide flag GF becomes "0", and in such a state, even if the automatic recognition flag RF is changed from "0" to "1", the entry guide is not printed-out. Therefore, it is possible to cause the operator to select whether or not the entry guide is to be printed-out. In addition, the change of the entry guide flag GF from "0" to "1" can not be executed at a time other than a time that the power source is turned-off once and then turned-on again, and the step S100 is executed, and therefore, by setting the entry guide flag GF as "0" once, it is possible to prevent the recording paper from being consumed due to the printing-out of the entry guide.

Returning to the step S105, if the CPU receives the original detection signal from the first original sensor 106 in this step, the process proceeds to a step S110 wherein it is determined whether or not the original is fed to the read position of the CIS 100. That is, in the step S110, the CPU 60 determines whether or not there is the original detection signal from the second original sensor 108. If no original detection signal from the second original sensor 108 is inputted, in a step S111, the CPU 60 sends an order signal to drive the transmission motor 90 to the motor control circuit 88. In response to the order signal, the transmission motor 90 is driven. That is, in the step S111, the transmission motor 90 is energized by the motor control circuit 88 in response to the order signal from the CPU 60. Accordingly, the original is fed by the original feed roller 94. Then, the step S111 is executed until the second original sensor 108 detects the original in the step S110.

Then, if the original is fed to the original read position, in a step S112, the CPU 60 applies an order signal to the motor control circuit 88 such that the transmission motor 90 is stopped by the motor control circuit 88. In a succeeding step S113, the CPU 60 determines whether or not the handset 56 is brought into the off-hook state on the basis of the signal from the NCU control I/O port 130. That is, if the handset 56 is brought into the off-hook state at a time that the original is fed to the read position of the CSI 100, the aforementioned telephone process is executed. That is, if the handset 56 is brought into the off-hook state at a state of the step S112, it means that the operator intends to use a telephone, and in such a case, the CPU 60 controls the LED control circuit 150 so as to turn the LED 152 off in a step S114, and thereafter, the CPU 60 executes the telephone calling process in a step S115.

If it is determined that the handset 56 is not the off-hook state in the step S113, it means that the facsimile transmission is to be processed. Therefore, in this case, the process proceeds to the step S2 of FIG. 12, i.e. a step S200 of FIG. 15.

Figure 15:
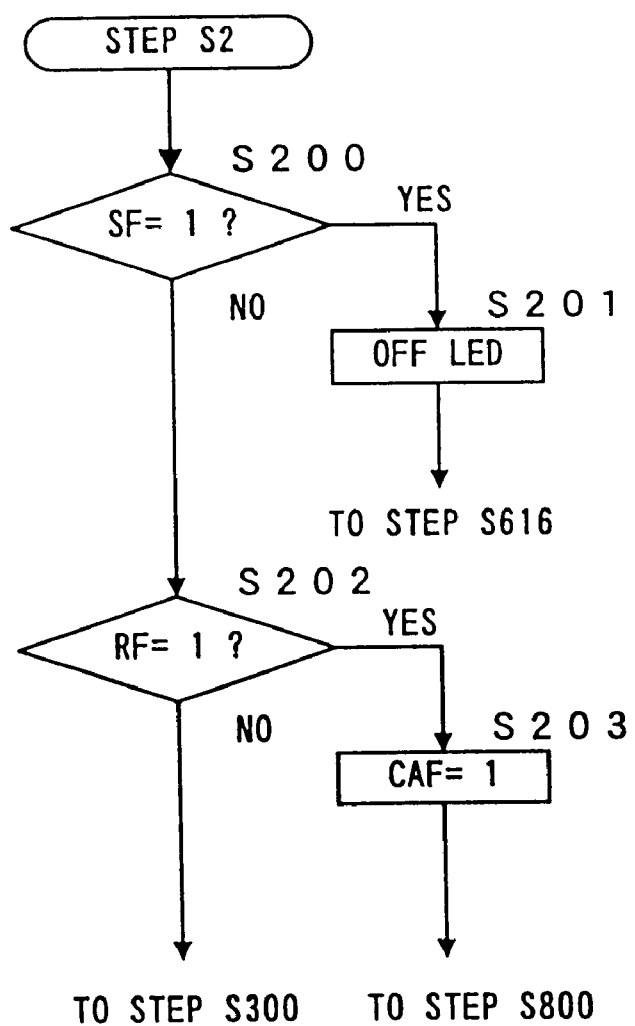
FIG. 15 is a flowchart showing an operation for checking whether or not automatic recognition is to be performed.

In a first step S200 of FIG. 15, the CPU 60 determines whether or not the pre-read flag SF is set with referring to the flag area 76b of the SRAM 76. If "YES" is determined in the step S200, it means that the original has been set, and that the addressing information hand-written on the original is correctly recognized, and that the character codes of the respective characters of the addressing information are set in the dial buffer 70 (FIG. 6). Therefore, in this case, after the LED 152 is turned-off in a step S201, the process proceeds to the step S6 (transmission process).

Then, in a case where the pre-read flag SF is not set, the CPU 60 determines whether or not the automatic recognition flag RF is "0" with referring to the flag area 76b of the SRAM 76 in a step S202. That is, in the step S202, the CPU 60 determines whether or not the automatic dialing mode wherein the addressing information hand-written on the original is recognized and the calling operation is to be automatically performed according to the recognition result. Therefore, if "NO" is determined in the step S202, the mode is the manually transmission mode, and the automatic recognition transition flag CAF is set as "1" in a step S203, and then, the process proceeds to a step S800. On the other hand, in a case where the automatic dialing mode is set, the process proceeds to the step S3 of FIG. 2, that is, a step S300 of FIG. 16.

Figure 16:
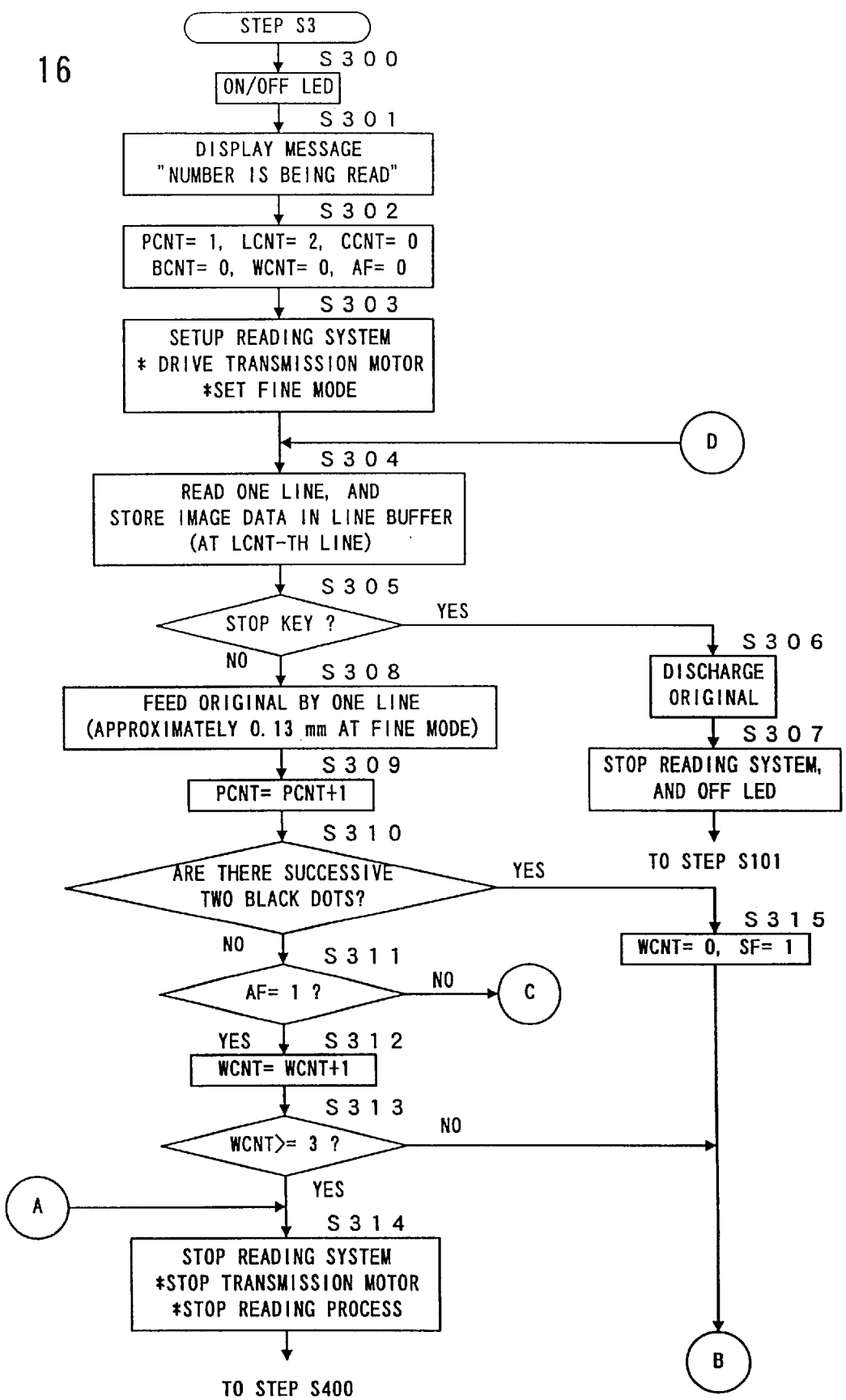
FIG. 16 and FIG. 17 are flowcharts showing operations for checking presence or absence of addressing information and for fetching image data of the addressing information.

In a first step S300 of FIG. 16, the CPU 60 controls the LED control circuit 150 to turn-on and off the LED 152, and thereafter, in a step S301, displays the message on the LCD 36 by controlling the display I/O port 136 (FIG. 3). That is, in the step S301, the CPU 60 reads the message data of "NUMBER IS BEING READ" from the message data area 64c of the ROM 64, and the message data is applied to the display I/O port 136, and resultingly, the message is displayed on the LCD 36. In addition, in the step S301, the message may be displayed in an audible manner with utilizing the speaker 128 together with the visible message by the LCD 36.

In a succeeding step S302, the CPU 60 initializes respective variables in the counter, pointer and variable area 76c of the SRAM 76. That is, the original feed counter PCNT is set at its initial value "1". The original feed counter PCNT is incremented at every timing that the original is fed by one line in the sub-scanning direction by the transmission motor 90, and therefore, with referring to the paper feed counter PCNT, it is possible to determine a position of the end line or the number of the lines in the area into which the addressing information is hand-written. In the write line counter LCNT, as an initial value, "2" is set. The write line counter LCNT is incremented at every timing that the data for one line is written into the line buffer 68 (FIG. 8). In addition, a reason why "2" is set in the write line counter LCNT as its initial value is that the image data obtained by reading the hand-written addressing information is prevented from being written in a first line of the line buffer 68 as shown in FIG. 8. Furthermore, with referring to the write line counter CNT, a line position at which the image data lastly written in the line buffer 68 can be recognized.

In the step S302, the column counter CCNT is made as "0". As described above, the column counter 1 CCNT to 2048 CCNT are respectively provided for respective columns from the first column to the 2048-th column of the line buffer 68, and the histogram in an X direction is produced for each column by the column counters 1 CCNT to 2048 CCNT. That is, the column counters 1 CCNT to 2048 CCNT are utilized for counting the number of the black dots for each column of the line buffer 68, and therefore, in the step S302, all the column counters are set as "0".

In the step S302, an initial value of "0" is set in the valid line counter BCNT. The valid line counter BCNT is utilized for image processing. That is, if there are two or more successive black dots in one line, the line is determined as a valid line at which the addressing information is hand-written. In contrast, if there are no successive black dots in one line, it is determined that only one black dot is due to dirt or dust of the original, and therefore, the line is not regarded as the valid line. Then, the valid line counter BCNT counts the number of successive valid lines. That is, if the valid lines do not succeed for 15 lines (in a case of the fine mode, equal to a length of 2 mm on the original), it is determined that valid addressing information is not written on the original. The valid line counter BCNT is utilized for such determination. That is, if a count value of the valid line counter BCNT does not exceed "15", the recognition of the hand-written addressing information is not performed. In other words, the characters of the addressing information having a size smaller than 2 mm in the sub-scanning direction of the original is removed from the target for recognition.

In the step S302, the white line counter WCNT is set as "0". The white line counter WCNT is utilized for detecting the last three white lines in the line buffer 68 as shown in FIG. 8. That is, when three white lines are successively stored in the line buffer 68, the end of the hand-written addressing area is determined. Therefore, the white line counter WCNT is utilized for detecting a last line of the hand-written addressing information, i.e. the end line.

In the step S302, the valid image area flag AF of the flag area 76*a* (FIG. 6) is reset. The flag AF is a flag representing whether or not the CIS 100 reads the area into which the addressing information is hand-written, and when the area is read, the flag AF is set as "1", and otherwise reset as "0".

In a next step S303 in FIG. 16, the CPU 60 sets-up a read system including (the CIS 100 and the transmission motor 90. More specifically, in the step S303, the CPU 60 drives the transmission motor 90 by applying the order signal to the motor control circuit 88, and sets the CIS 100 and the image processing circuit 98 in the fine mode. That is, in a case where the hand-written addressing information is to be recognized, the fine mode is forcedly set in the step S302 irrespective which mode is set by the operator with utilizing the image quality selection key 44.

Then, in a step S304, the image data from the CIS 100 is written in the line buffer 68 at a line designated by the write line counter LCNT. If the first line, the image data from the CIS 100 will be written in the second line of the line buffer 68. In addition, the writing of the image data to the line buffer 68 in the step S304 is actually executed according to the DMA, and therefore, the CPU 60 may designate the address of the line buffer 68 and a data length of the image data to the DMA circuit 86 (FIG. 3) only. Thus, the image data for one line from the CIS 100 is written in the line buffer 68.

In a succeeding step S305, the CPU 60 determines whether or not the stop/clear key 52 (FIG. 2) is operated with referring to a signal from the input I/O port 134. If the stop/clear key 52 is operated at this stage, it means the cases (1) that the operator intends to copy the original, but the reading operation of the addressing information has been started, or (2) that the original is not fed normally, and therefore, in response to the operation of the stop/clear key 52, the original is discharged. Therefore, in a case where "YES" is determined in the step S305, the process proceeds to a step S306 wherein the original is discharged, and thereafter, in a step S307, the CPU 60 stops the reading system and turns-off the LED 152, and the process is returned to the step S101.

If "NO" is determined in the step S305, the CPU 60 feeds the original by one line (approximately 0.13 mm) at the fine mode by driving the transmission motor 90 in a step S308. Then, in a step S309, the original feed counter DCNT is incremented.

In a succeeding step S310, it is determined whether or not there are two or more successive black dots in one line on the basis of the image data stored in the line buffer 68 at the previous step S304, that is, it is determined whether or not the one line previously read is the valid line. Specifically, the CPU 60 reads the image data of 200 byte (approximately 200 mm on the original) from the 40-th column to the 2048-th column of the line buffer 68 except the data first 5 byte (approximately 5 mm on the original) from the line buffer 68. In addition, a reason why the image data of the first 5 byte is not read from the line buffer 68 is that there is a possibility that an edge of the original is detected within such a range, and therefore, such the possibility is to be avoided.

Then, the CPU 60 fetches the image data of 200 byte read from the line buffer 68 into an accumulator (not shown). At this time, one byte is first read and the succession of the black dots is determined with utilizing 9 bits in total of the image data of the one byte and the most significant bit of the image data of the next byte. That is, if the succession of the black dots is determined for each byte, even if the least significant bit of the preceding byte and the most significant bit of the succeeding byte are successively black dots, there is a possibility that it can not determine that the black dots are successive. Therefore, the succession of the black dots is determined with utilizing the 9 bits in total including the most significant bit of the image data of the next byte. Specifically, the CPU 60 determines whether or not there are successive "1" of two or more bits by checking a content of the accumulator. Thus, in the step S310, the CPU 60 determines whether or not the image data previously read in the line buffer 68 is the valid line.

If "NO" is determined in the step S310, in a step S311, the CPU 60 determines whether or not the valid image area flag AF is set. If the flag AF has been set, in a next step S312, the white line counter WCNT is incremented. In a next step S313, it is determined whether or not a count value of the white line counter WCNT becomes equal to or more than "3". As described above, in a case where three successive white lines appear in the line buffer 68 as shown in FIG. 8, the end line of the writing area of the hand-written addressing information is determined. Therefore, if "YES" is determined in the step S313, it means that the end line of the writing area of the addressing information is detected, and therefore, after the reading system is stopped in a next step S314, the process proceeds to the step S4 of FIG. 12, that is, a first step S400 of FIG. 20.

If "YES" is determined in the previous step S310, that is, if it is determined that the image data of one line stored in the line buffer 68 in the step S304 is the valid line, in a step S315, the CPU 60 clears the white line counter WCNT and sets "1" in the pre-read flag SF. Since the white line counter WCNT is a counter for detecting whether or not the three or more successive white lines appear, the white line counter WCNT is cleared at every time that the valid line is detected. Then, as similar to a case where "NO" is determined in the S313, the process proceeds to a step S316 shown in FIG. 17.

In the step S316, the CPU 60 increments the column counter CCNT of the column corresponding to a position of the black dot in the line designated by the write line counter LCNT for the line buffer 68. That is, in the step S316, the column counter CCNT of the column at which the black dot exists is incremented. Then, in a step S317, the CPU 60 increments the write line counter LCNT, and increments the valid line counter BCNT.

Then, in a next step S318, the CPU 60 determines whether or not the count value of the write line counter exceeds "128". That is, in the step S313, it is determined whether or not the image data is written in all of the 128 lines of the line buffer 68 shown in FIG. 8. Therefore, until the line buffer 68 is filled, "NO" is determined in the step S318, and the process proceeds to a step S319.

In the step S319, it is determined whether or not the valid image area flag AF is set. If the valid line is detected in the previous step S310, it means that there is the valid image area (writing area of the addressing information), and therefore, in the step S319, it is determined that the flag AF is set. If "NO" is determined in the step S319, in a next step S320, the CPU 60 determines whether or not the count value of the valid line counter BCNT reaches "15". That is, in the step S320, the CPU 60 determines whether or not there are valid lines for successive 15 lines. Then, when "YES" is determined in the step S320, the valid image area flag AF is first set (step S321). As described above, since the character of the addressing information having a size smaller than 2 mm on the original is not to be recognized, only a time that the number of the valid lines exceeds 15 lines the valid image area flag AF is set.

If "NO" is determined in the previous step S311 (FIG. 16), the process proceeds to a step S322 wherein the CPU 60 sets an initial value of "2" in the write line counter LCNT, and clears the valid line counter BCNT, the column counters 1CCNT–2048CCNT and the pre-read flag SF. Thereafter, as similar to a case where "NO" is determined in the step S320, the process proceeds to a next step S323. In the step S323, the CPU 60 determines whether or not the count value of the original feed counter PCNT exceeds "231". That is, in the step S323, it is determined whether or not the original is fed more than 30 mm (=231/7.7). This is based on the assumption that the upper end of the character of the hand-written addressing information exists within 30 mm from an upper end of the original. Therefore, by changing "231" in this step S323, the recognition area of the hand-written addressing information can be enlarged or reduced. If "YES" is determined in the step S323, it means that the character of the addressing information is not hand-written within the range of 30 mm from the upper end of the original. Therefore, in this case, in a step S324, the CPU 60 stops the reading system, and in a succeeding step S325, the CPU 60 displays the message such as "NO NUMBER" on the LCD 36. Thereafter, in a step S326, the CPU 60 sets "1" in the automatic recognition transition flag CAF, and then, the process proceeds to the step S800 shown in FIG. 29.

Figure 20:
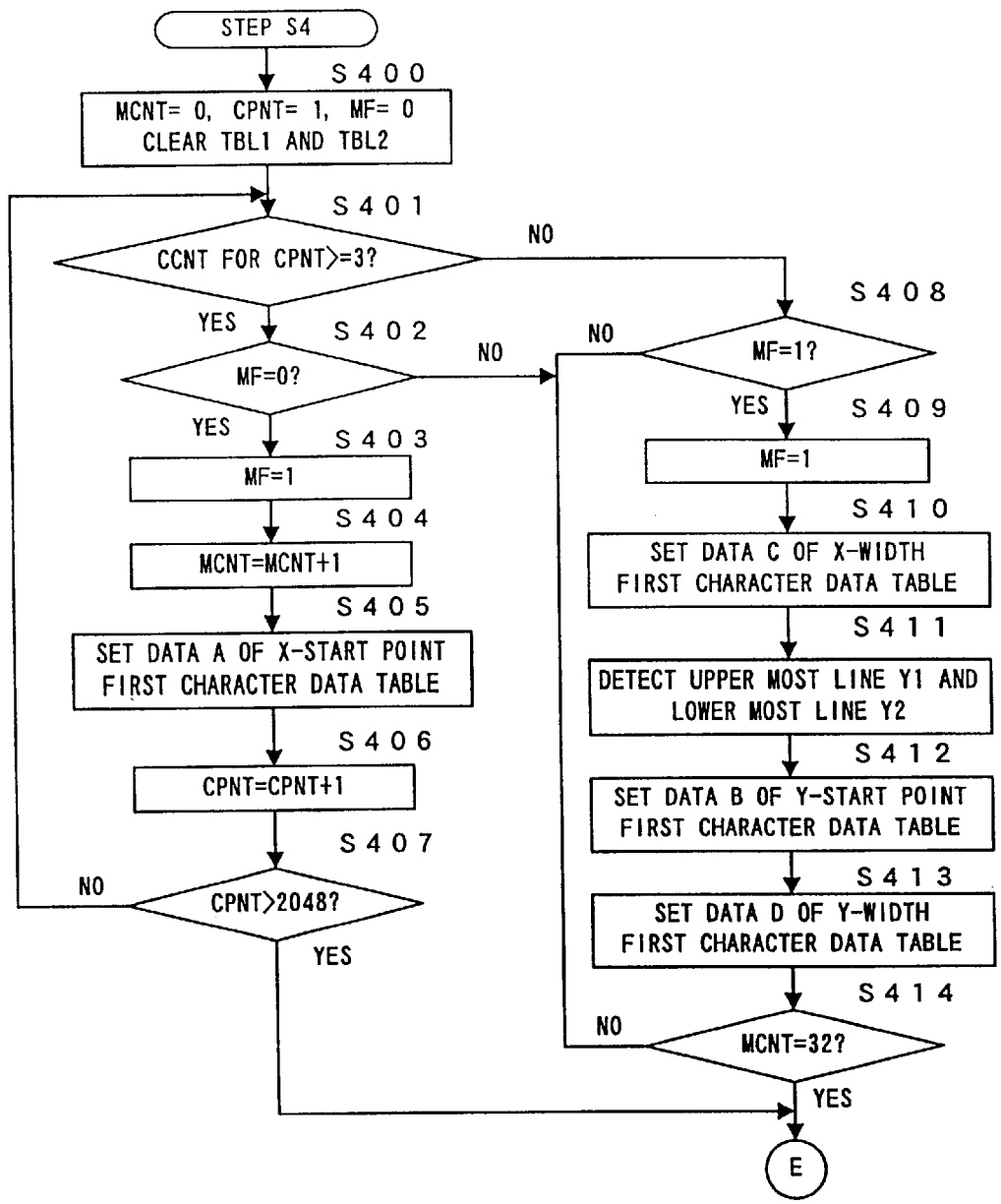
FIG. 20 and FIG. 21 are flowcharts showing an operation of a step for cutting-out respective characters of the addressing information.

Furthermore, if it is detected that the line buffer 68 is filled in the previous step S318, the reading system is stopped in the step S324 (FIG. 16), and thereafter, the process proceeds to the step S4 of FIG. 12, i.e. to the first step S400 of FIG. 20. That is, in a case where "YES" is determined in the step S318, as similar to a case where "YES" is determined in the previous step S313, it is regarded as that the end line of the writing area of the hand-written addressing information is detected.

If the previous step S314 is executed, it means that the image data of the hand-written addressing information is stored in the line buffer 68 in a recognizable manner, and in this case, the process proceeds to the step S4 shown in FIG. 12, and therefore, each of the characters hand-written as the addressing information is cut-out. That is, in the step S4, an area of each character surrounded by a dotted line in FIG. 18 and an area of a space are detected. Therefore, in the step S4, the data of the start point X, the start point Y, the X width and the Y width of each character shown in FIG. 18 are written in the character data tables 72 and 74 (FIG. 6) as data A, B, C and D.

In the first step S400 of FIG. 20, the initialization for cutting-out the character is performed. More specifically, in the step S400, an initial value of "0" is set in the character number counter MCNT which is for counting the number of the characters including portions of the spaces in the line buffer 68. A reason why the portion of the spaces are also counted is that the spaces are utilized as pause data in a later transmission process (step S6). Then, in the step S400, an initial value of "1" is set in the column pointer CPNT which is functions as a read pointer for the line buffer 68 and designates which one of 2048 columns shown in FIG. 8. Furthermore, in the step S400, the valid character flag MF is reset. The valid character flag MF is a flag indicating whether or not the column pointer CPNT exists in the dotted line area in FIG. 18. If the flag MF is set, the valid character is determined. Furthermore, in the step S400, the first storing portions to the 32nd storing portions of the first character data table 72 and the second character data table 74 (FIG. 6) are all cleared.

Then, in a step S401, the CPU 60 determines whether or not the count value of the column counter CCNT of the column indicated by the column pointer CPNT is more than "3". That is, in the step S401, it is determined whether or not three or more black dots exist in the column designated by the column pointer CPNT. By determining whether or not three or more black dots exist in one column, it is possible to determine whether or not the column is within the valid character area. Therefore, if "YES" is determined in the step S401, next steps S402 and S403 are executed, and therefore, the valid character flag MF is set. Then, in a step S404, the CPU 60 increments the character number counter MCNT. In a next step S405, the CPU 60 writes a value of the column pointer PCNT in the storing portion of the first character data table TBL1 designated by the character number counter MCNT, i.e. the MCNT-th storing portion as data A of the start point X shown in FIG. 18. That is, in the step S405, the start point X of the character designated by the character number counter MCNT is written in the first character data table 72 as the data A.

After the data A of the start point X is written in the step S405, or after "NO" is determined in the step S402, the CPU 60 increments the column pointer CPNT in a step S406. Thereafter, in a step S407, it is determined whether or not a value of the column pointer CPNT exceeds "2048". That is, in the step S407, it is determined whether or not the determination in the step S401 has been completed for all the columns of the line buffer 68. Therefore, if the determination whether or not 3 or more black dots exists in the column has not been completed for all the columns, the steps S401 to S406 are repeatedly executed.

Then, when the column pointer CPNT designates the space portion between the first character and the second character, for example, "NO" is determined in the step S401 wherein it is determined whether or not the valid character flag MF is set. In a case where the first character is first detected, the flag MF is set, and therefore, "YES" is determined in the step S408, and then, in a next step S409, the valid character flag MF is reset. Thereafter, by executing steps S410 to S413, remaining three data B, C and D are written in the respective storage portions of the first character data table 72.

In the step S410, the data C of the X width shown in FIG. 18 is stored in the X width area of the first character data table 72 being designated by the valid character number counter MCNT. The X width data C is a difference between the value of the column pointer CPNT and a value (data A) which has been set in the start point X area of the storage portion of the first character data table being designated by the character number counter MCNT in the step S405.

Then, in a next step S411, the CPU 60 detects an uppermost line and a lowermost line in each of which the black dots exist within a range of the column represented by the data A of the start point X to the column designated by the column pointer CPNT in the line buffer 68. That is, in the step S411, the uppermost line Y1 and the lowermost line Y2 of the character area shown by the dotted line in FIG. 18 are detected. Then, in a step S412, the number of the uppermost line Y1 detected in the step S411 is set as the data B in the start point Y area of the storage portion of the first character data table 72 being designated by the character number counter MCNT.

Thereafter, in a step S413, the CPU 60 sets the data D in the Y width area of the storage portions of the first character data table 72 being designated by the character number counter MCNT. The data D can be evaluated on the basis of the lowermost line Y2 and the uppermost line Y1 detected in the step S411 as "the lowermost line–the uppermost line+1".

If all of the four data A, B, C and D are thus stored in the storage portion of the first character data table 72 being designated by the character number counter MCNT, in a next step S414, the CPU 60 determines whether or not the count value of the character number counter MCNT reaches "32". That is, in the step S414, it is determined whether or not the data A of the start point X, the data B of the start point Y, the data C of the X width and the data D of the Y width are all stored in all of the first storage portion to the 32nd storage portion of the first character data table 72. Therefore, if "NO" is determined in the step S414, the previous steps S406 to S413 are repeatedly executed.

In addition, in order to detect the uppermost line Y1 and the lowermost line Y2 of the character area in the previous step S411, the CPU 60 reads the image data of 1 byte from the line buffer 68 into the accumulator, and detects the number of "1" while the accumulator is shifted. By such a method, the line number of the uppermost line Y1 can be detected.

Figure 17:
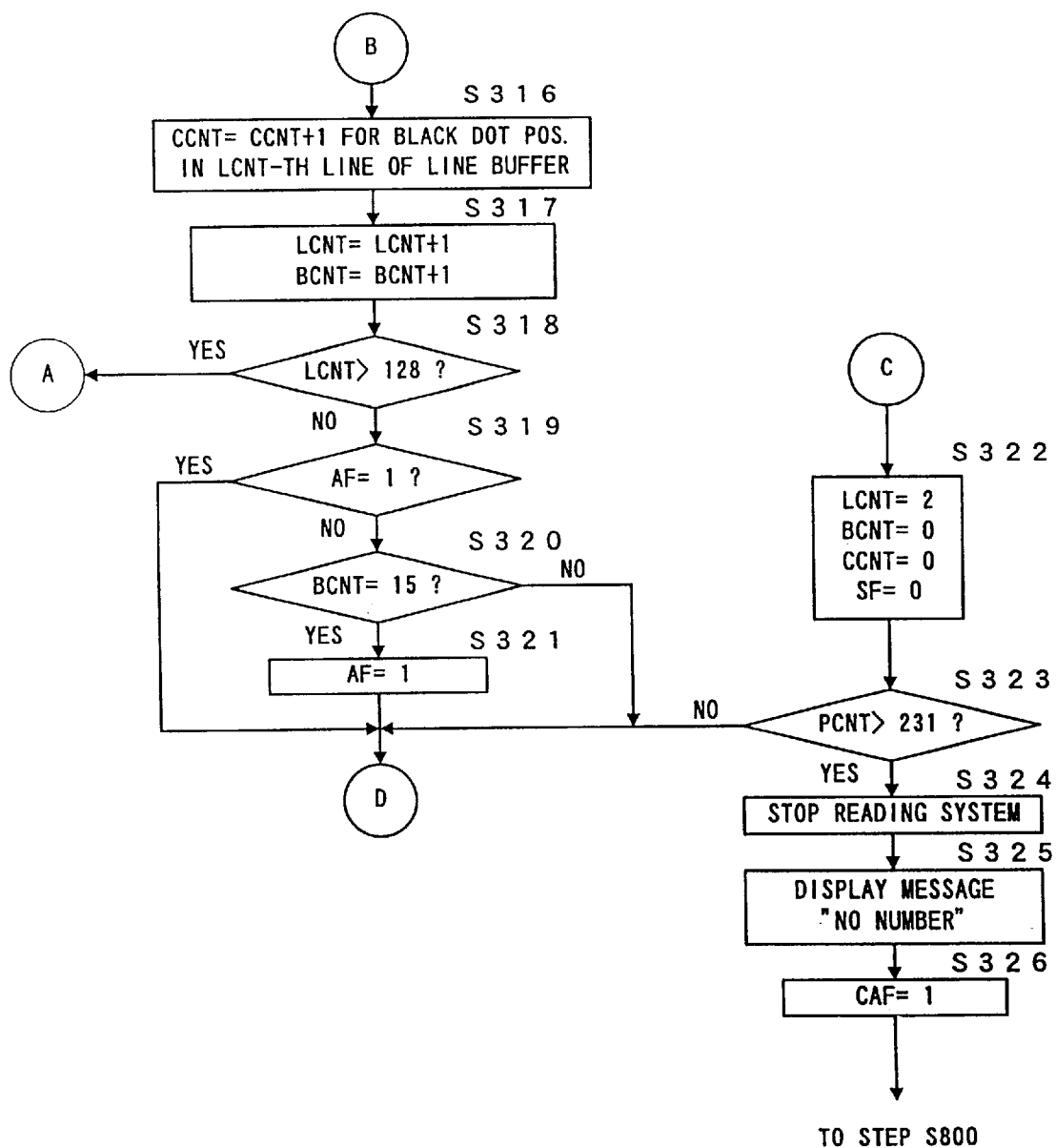
Figure 21:
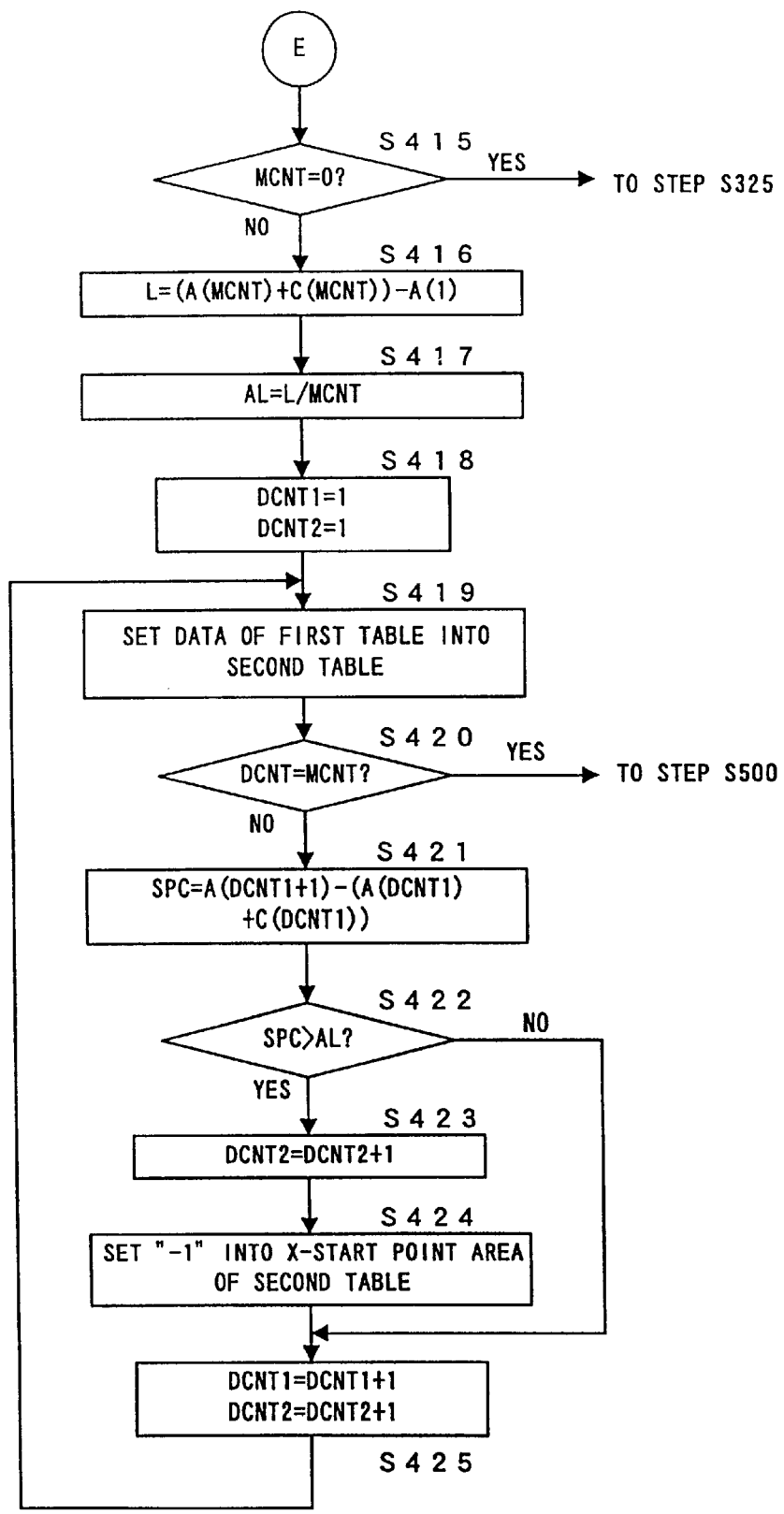

In a next step S415 shown in FIG. 21, the CPU 60 determines whether or not the count value of the character number counter MCNT is "0". That is, in the step S415, it is determined whether or not one or more valid character exists in the writing area for the hand-written addressing information. Therefore, in a case where "YES" is determined in the step S415, there is no valid character written in the writing area for the addressing information to be recognized, and therefore, the process returns to the previous step S315 (FIG. 17).

However, if "NO" is determined in the step S415, the CPU 60 calculates a length L of the addressing information writing area shown in FIG. 18 in a next step S416. Specifically, in the step S416, the length L is calculated on the basis of the value A1 (FIG. 19) set in the start point X area of the first storage portion of the first character data table 72, and the values A (MCNT) and C (MCNT) set in the start point X area and the X width area of the first character data table 72 being designated by the character number counter MCNT. That is, in the step S416, the length L in the main scanning direction that the characters of the addressing information are hand-written is detected. Next, in a step S417, the CPU 60 calculates an average distance between characters AL. That is, in the step S417, a value obtained by dividing the character area length L evaluated in the step S416 by the number of the characters represented by the character number counter MCNT is evaluated as the average distance between characters AL. Then, in a next step S418, the CPU 60 sets "1" in the read pointer DCNT1 for the first character data table 72 and the write pointer DCNT2 for the second character data table 74, respectively.

By executing next steps S419 to S425, the CPU 60 re-writes the data of the first character data table 72 in the second character data table 74. In addition, at this time, the data indicative of the space is also written in the second character data table 74.

Figure 19:
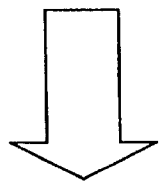
FIG. 19 is an illustrative view showing a state where data of the first character data table are written into the second character data table.

More specifically, in the step S419, as shown in FIG. 19, the data A, B, C and D of the storage portions of the first character data table 72 being designated by the read pointer DCNT1 are set in the storage portions of the second character data table 74 being designated by the write pointer DCNT2. Then, in a next step S420, it is determined whether or not the read pointer DCNT1 for the first character data table 72 reaches the number of the characters counted by the character number counter MCNT, that is, it is determined whether or not all the data stored in the first character data table 72 are written in the second character data table 74. Therefore, if "YES" is determined in the step S420, the process proceeds to the next step S5 (FIG. 12), i.e. a step S500 shown in FIG. 22.

On the other hand, in a state where all the data of the first character data table 72 have not been written in the second character data table 74, "NO" is determined in the step S420. Therefore, in a next step S421, the CPU 60 calculates a space width SPC between respective characters being handwritten in the addressing information area. Specifically, in the step S421, the space width SPC between the (DCNT1)-th character and the (DCNT1+1)-th character being stored in the line buffer 68 is calculated on the basis of the values A(DCNT1) and C(DCNT1) respectively set in the start point X area and the X width area of the storage portions of the first character data table 72 being designated by the read pointer DCNT1 and the value A(DCNT1+1) set in the start point X area of a next storage portion of the first character data table 72. Then, the space width SPC thus calculated as well as the average distance AL calculated in the S417 are stored in the space width register SPC and the average distance register AL of the SRAM 76, respectively.

Then, in a step S422, the CPU 60 determines whether or not the space width SPC is larger than the average distance between characters AL with referring to the average distance register AL and the space width register SPC. If "YES" is determined in the step S422, in a next step S423, the CPU 60 increments the write pointer DCNT2 for the second character data table 74, and then, executes a next step S424.

If "YES" is determined in the previous step S422, it means that there is a space having a space width larger than the average distance between characters AL between the (DCNT1)-th character and the (DCNT1+1)-th characters. Therefore, in this case, "-1" representative of the space is set in the corresponding portion of the second character data table 74 as shown in FIG. 19 in the step S424. That is, in the step s424, "-1" is set in the area of the start point X of the storage portion of the second character data table being designated by the write pointer DCNT2. Then, in the step S425, the read pointer DCNT1 and the write pointer DCNT2 are respectively incremented.

In a state where the characters or the spaces are thus re-written in the second character data table 74 for all the characters stored in the second character data table 74, "YES" is determined in the step S420, and therefore, the process proceeds to the step S500.

Figure 22:
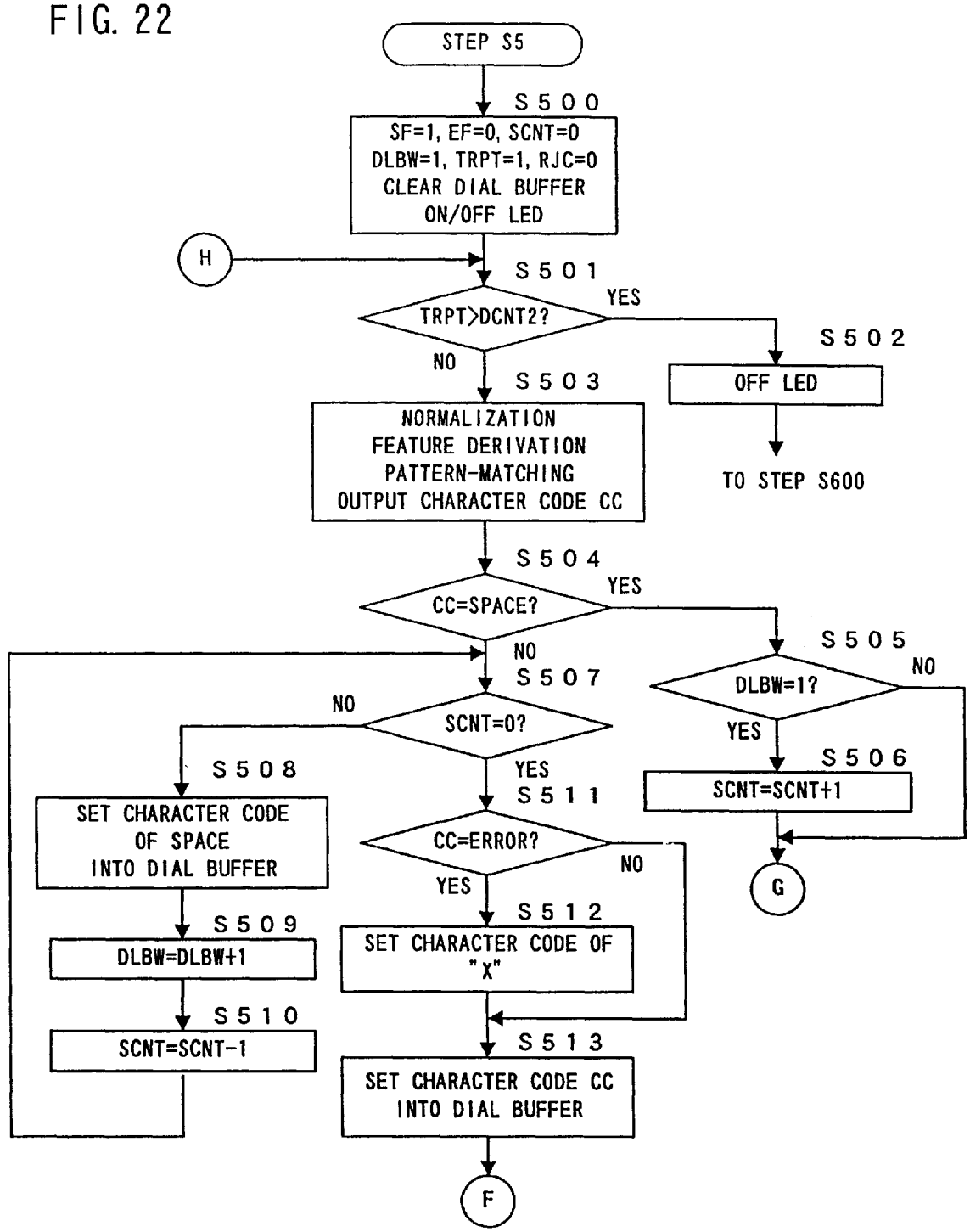
FIG. 22 and FIG. 23 are flowcharts showing an operation of a recognition step.

In the first step S500 of FIG. 22, the CPU 60 performs initialization for executing the recognition of each character of the hand-written addressing information being cut-out according to FIG. 18 to FIG. 21. That is, in the step S500, the pre-read flag SF is set and the error flag EF is reset. Furthermore, in the step S500, an initial value of "0" is set in the space counter SCNT (FIG. 6), and initial values of "1" are respectively set in the dial buffer write pointer DLBW and the second character data table read pointer TRPT. Furthermore, in the step S500, the dial buffer 70 (FIG. 6) and the rejected character number counter RJC (FIG. 6) are both cleared, and the LED 152 is turned-on and off.

In addition, the dial buffer write pointer DLBW is a pointer for designating a writing digit position of the dial buffer 72 into which the addressing information of 32 digits can be written, and the read pointer TRPT is a pointer for designating the storage portion of the second character data table 74.

Then, in a step S501, it is determined whether or not the read pointer TRPT for the second character data table 74 exceeds the write pointer DCNT2 for the second character data table 74, that is, it is determined whether or not the data are all read from all the storage portions from the first storage portion to the 32nd storage portion of the second character data table 74. If "YES" is determined in the step S501, the CPU 60 terminates the turning-on and off of the LED 152 in a step S502, and thereafter, the process proceeds to the step S6 of FIG. 12, i.e. a step S600 shown in FIG. 24.

On the other hand, if "NO" is determined in the step S501, the process proceeds to a step S503 wherein the CPU 60 executes the recognition of the character as cut-out with referring to the recognition dictionary area 64b (FIG. 4) of the ROM 64 and etc. That is, the image data of respective character areas in the line buffer 68 are read in accordance with the data stored in the respective storage portions of the second character data table 74, and the image data as read are normalized, and feature parameters of the image data are derived. Then, according to a method for well-known pattern matching, by comparing the feature as derived with the recognition dictionary area 64b, it is determined that the character being cut-out is which one of the numerals of "0"–"9" and the symbols "*", "#", "-" and etc. Then, a character code CC representative of the character as recognized is outputted.

In a step S504, the CPU 60 determines whether or not the character code CC outputted at the step S503 is a character code representative of the space. If "YES" is determined in the step S504, the process proceeds to a next step S505 wherein it is determined whether or not the dial buffer write pointer DLBW is "1". If the dial buffer write pointer DLBW is "1", the process proceeds to a step S525 after the space counter SCNT is incremented in a step S506 so that the character code of the space is ignored.

On the other hand, if "NO" is determined in the step S504, steps S507 to S510 are executed so as to write the character code of the space in the dial buffer 70. More specifically, in the step S507, it is determined whether or not the space counter SCNT becomes "0". If the space counter SCNT is not "0", it means that some spaces (data of "-1") exist in the second character data table 74. In such a case, the character code of the space is written in the dial buffer 70 according to the dial buffer write pointer DLBW in the next step S508. Then, in the next step S509, the dial buffer write pointer DLBW is incremented, and the space counter SCNT is decremented in the step S510.

Then, if "YES" is determined in the step S507, that is, if it is determined that the space counter SCNT is "0", in a next step S511, the CPU 60 determines whether or not the character code previously outputted is an error code. If the error code, in a next step S512, the character code is replaced with a character code of "X" in alphabet. Then, in a step S513, one of the character code outputted at the step S503 and the character code replaced at the step S512 is written in the dial buffer 70 according to the dial buffer write pointer DLBW.

Then, in a next step S514, the CPU 60 displays the characters of the hand-written addressing information as recognized on the LCD 36 according to the character codes set in the dial buffer 70. Therefore, the operator can confirm the addressing information. Furthermore, at this time, the CPU 60 terminates the turning-on and off of the LED 152 to notify to the operator that the recognition process in the step S503 and thereafter is completed.

Figure 29:
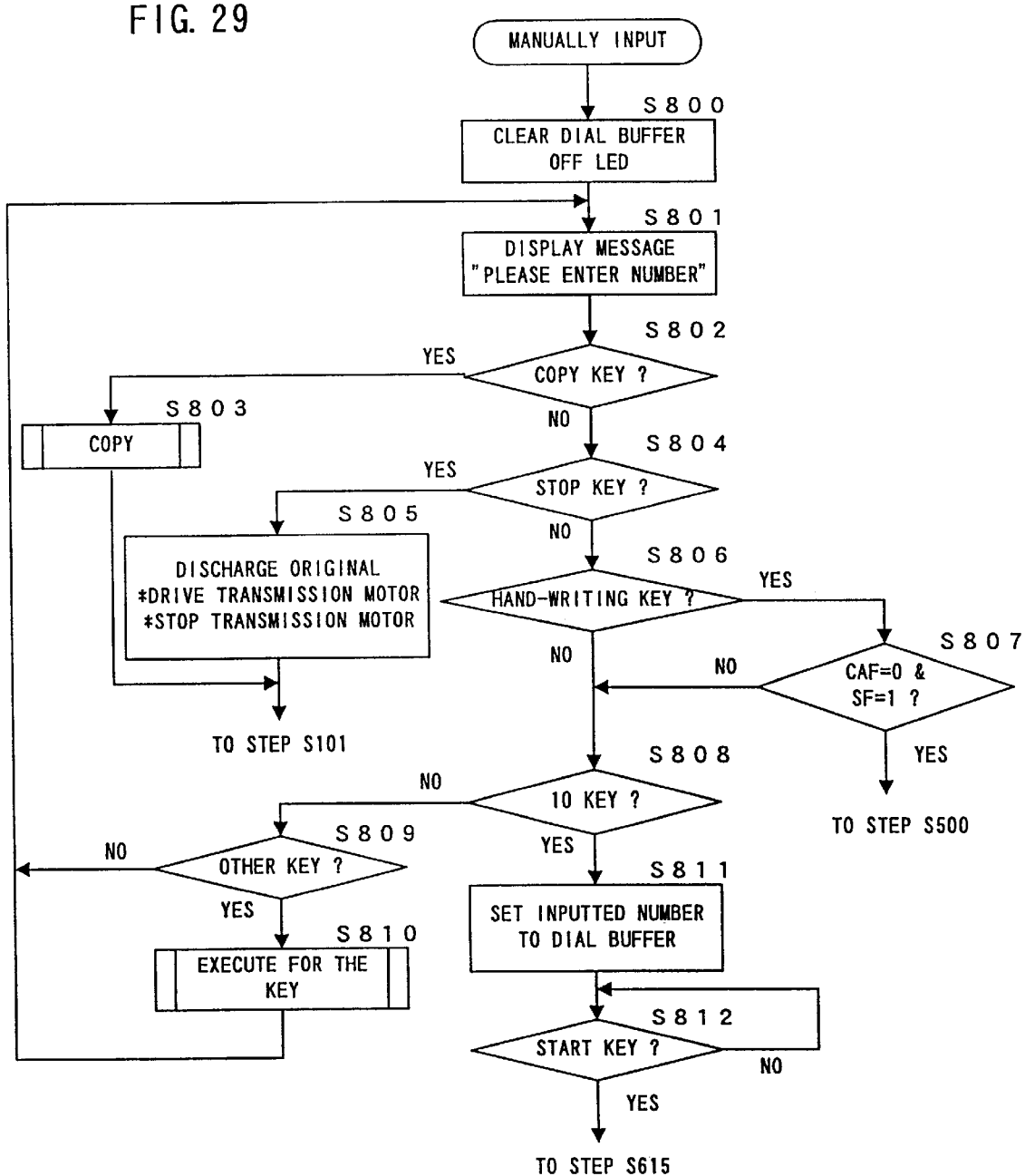
FIG. 29 is a flowchart showing an operation at a time that the addressing information is manually inputted.

In a step S515 succeeding to the step S514, the CPU 60 determines whether or not the stop/clear key 52 (FIG. 2) is operated. If the stop/clear key 52 is operated, it means that the operator intends to make the recognition result displayed on the LCD 36 in the previous step S514 to be invalid or to stop the recognition process and transit the mode to the manually input mode, and therefore, in a next step S516, the error flag EF is set. Then, in a succeeding step S517, it is determined whether or not the confirmation print flag CPF has been set, and if "NO" is determined, the process directly proceeds to the step S800 (FIG. 29).

On the other hand, if "YES" is determined in the step S517, the confirmation print is performed in a step S518. More specifically, in the step S518, the CPU 60 controls the record control portion 82 and the motor control portion 88 (FIG. 3) such that the image data being the target for recognition in the previous step S503 or the normalized data obtained in the step S503 can be print-out. Thereafter, in a step S519, the confirmation print flag CPF is set, and then, the process proceeds to the step S800. In addition, in performing the confirmation print, print data of "CONFIRMATION PRINT" is read and printed as a title together with the image data.

Furthermore, the confirmation print flag CPF is a flag for determining whether or not the operation of the stop/clear key 52 detected in the previous step S515 during a time that the automatic recognition mode is executed is the first time operation. More specifically, as clearly understood by a later description, even if the mode is transited from the automatic recognition mode to the manually input mode in response to the operation of the stop/clear key 52 in the step S515, it is possible to return to the automatic recognition mode again, and after the returning to the automatic recognition mode, if the mode is to be transited to the manually input mode again according to the operation of the stop/clear key 52 detected in the step S515, the confirmation print is inhibited from being performed. A reason why the confirmation print is inhibited that the confirmation print itself is for confirming the addressing information hand-written by the operator, and therefore, such the confirmation print is normally sufficient to the operator by only one time during the automatic recognition mode, and accordingly, if the confirmation print is outputted many times irrespective of the intention of the operator becomes waste of the recording paper.

If no operation of the stop/clear key 52 is detected in the step S515, the CPU 60 determines whether or not the handset 56 is brought into the off-hook state in a succeeding step S510a. The off-hook state means a state where the hook switch detection circuit 126 detects a fact that the handset 56 is picked-up and thus the hook switch HS, i.e. the switch 127 is turned-on, or a state where the hands free key 32 is operated. Then, the CPU 60 proceeds to a step S515b at such the off-hook state.

In the step S515b, the CPU 60 controls the relay drive circuit 122 such that the relay CML is switched to the signal line for communication with voice. Then, the CPU 60 controls the DTMF generation circuit 110 or the DP control circuit 124. Therefore, the DTMF signal or the dial pulse according to the dial number being stored in the dial buffer 70 is outputted to the telephone lines L1 and L2. Therefore, in this step S515b, a calling process for communication with voice is executed. Accordingly, if there is a response from the called party, it becomes possible to communicate with voice with the called party. In addition, if "NO" is determined in the step S515, in a succeeding step S520, it is determined whether or not the character code is the character code representative of "X" in alphabet. That is, in the step S520, it is determined whether or not there is the character could not be recognized in the previous recognition step S503 (the rejected character).

The character that could not be recognized in the step S503 is replaced with the character code of "X" in the step S512, and therefore, in the step S520, by detecting the character code of "X", it can be determined there is the character that could not be recognized.

If there is the character that could not be recognized (the rejected character), in steps S521 and S522, the content of the error processing mode switch EMODE is checked. If "YES" is determined in the step S521, it means that "0" is set in the error processing mode switch EMODE, and therefore, the recognition operation of the hand-written addressing information is suspended, and the process proceeds to the step S516 so as to cancel the recognition result obtained by that time. In a case where "NO" is determined in the step S521 and "YES" is determined in the step S522, "1" is set in the error processing mode switch EMODE. This means that the rejected character occurs in the recognition process, and therefore, the recognition process is suspended, and the mode is transited to the error processing mode (S524), and thereafter, the process proceeds to a step S525. In addition, the first correction routine in the step S524 will be described later in detail. If "NO" is determined in the step S522, it means that "2" is set in the error processing mode switch EMODE, and therefore, in a next step S523, the rejected character number counter RJC is incremented, and thereafter, the process proceeds to the step S525 wherein the read pointer TRPT for the second character data table 74 is incremented, and then, the process returns to the previous step S501 to continue the recognition process.

Figure 24:
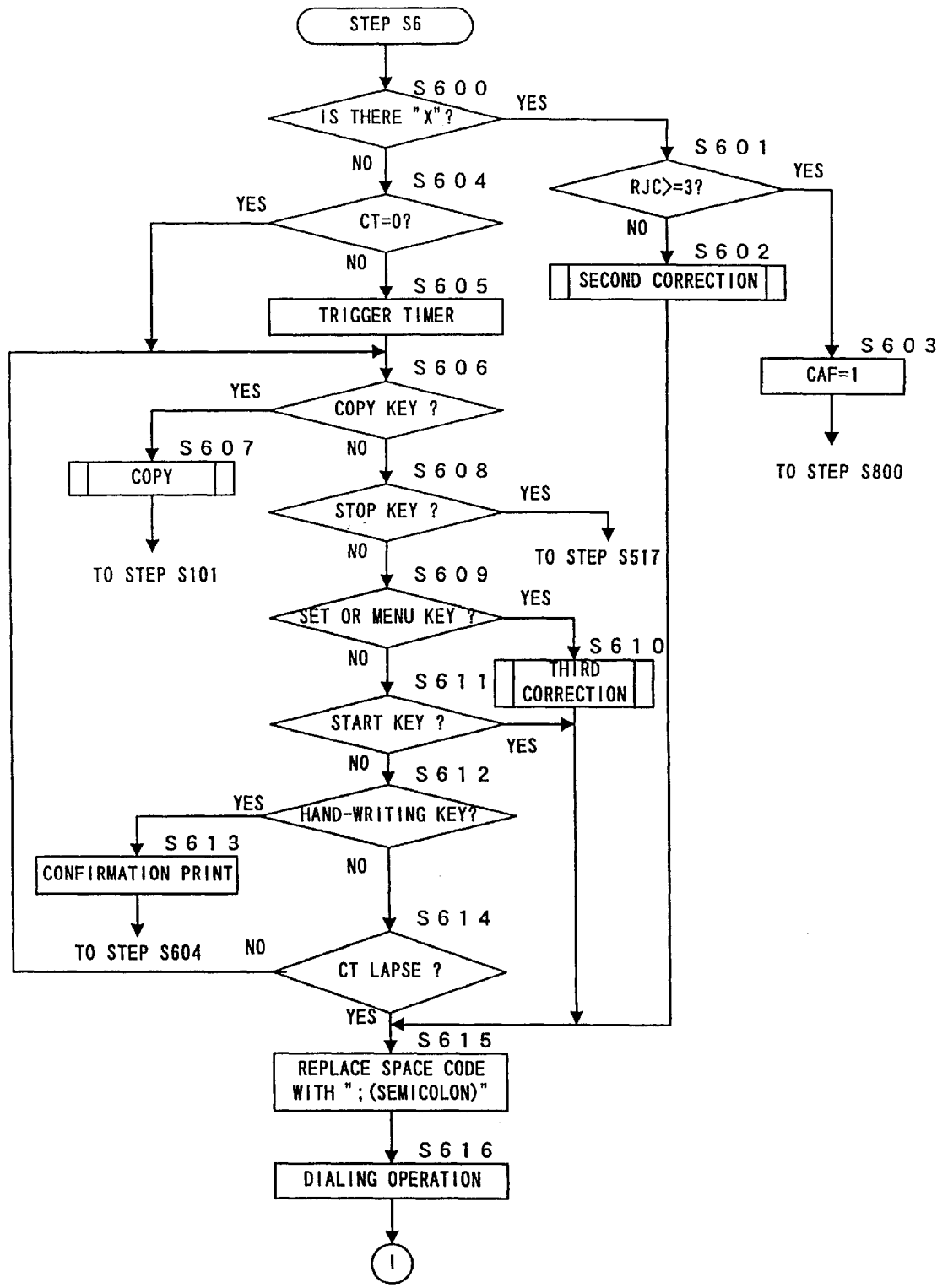
FIG. 24 to FIG. 26 are flowcharts showing an operation of a transmission step.

In the step S600 in FIG. 24, the CPU 60 determines whether or not there is the character code of alphabet "X" in the dial buffer 70. If "YES" is determined in the step S600, in a next step S601, the CPU 60 determines whether or not the count value of the rejected character number counter RJC becomes more than "3". If "YES" is determined in the step S601, in a next step S603, the CPU 60 sets the automatic recognition transition flag CAF, and thereafter, the process proceeds to the step S800 (FIG. 29). On the other hand, if "NO" is determined in the step S601, the process proceeds to the correction processing mode of a step S602, and thereafter, the process proceeds to a step S615. In addition, the second correction routine of the step S602 will be describe later in detail.

If "NO" is determined in the previous step S600, in a step S604, the CPU 60 determines "0" or the variable value of "1"–"10" is set in the recognition confirmation time switch CT. If the switch CF is set as "0", the calling operation is performed in response to the operation of the start key 54. On the other hand, the numeral value other than "0" is set in the switch CT, in a next step S605, the timer counter TM (FIG. 6) is triggered.

Figure 23:
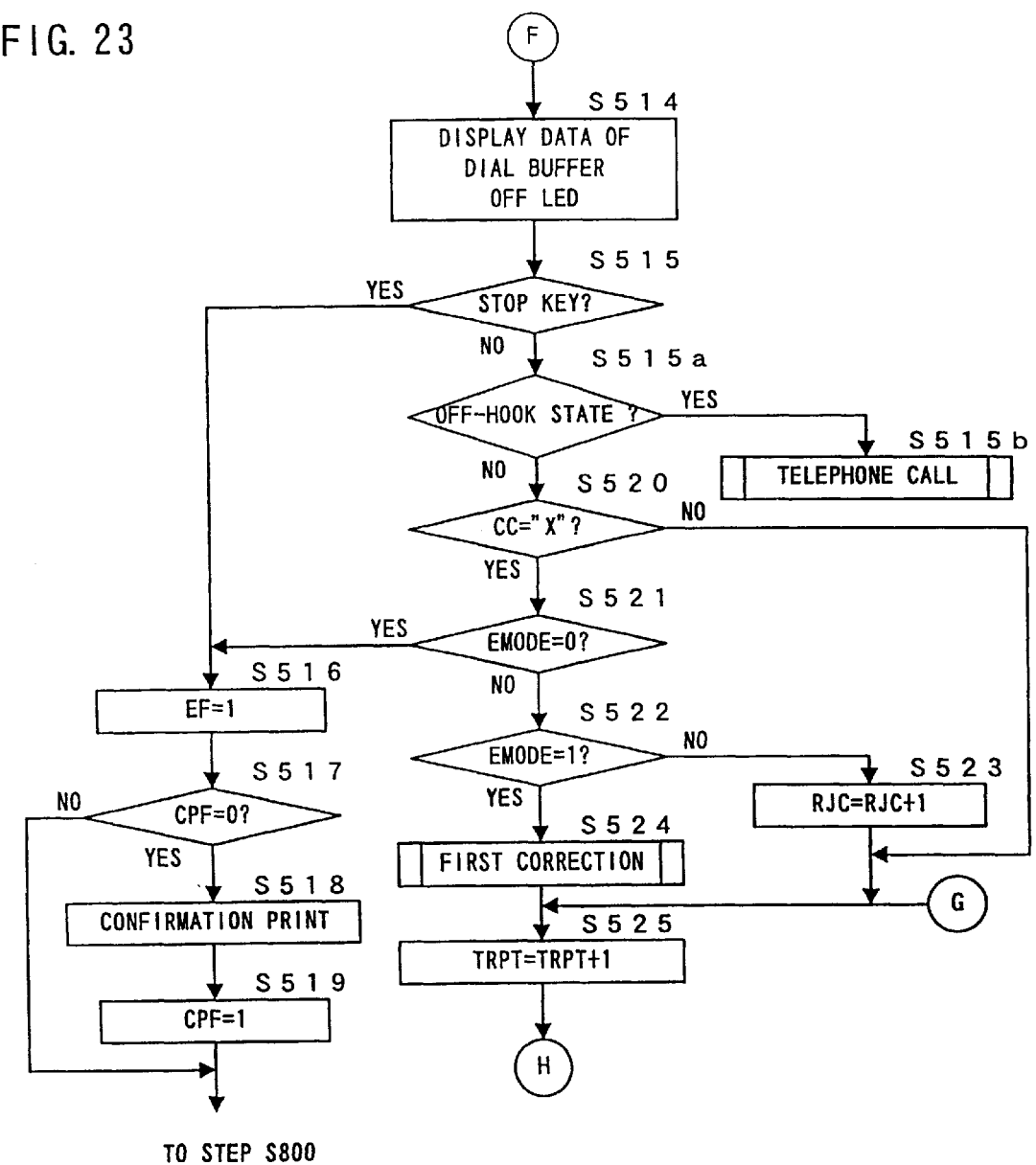

Then, in a next step S606, the CPU 60 determines whether or not the copy key 58 (FIG. 2) is operated. If the operation of the copy key is detected in the step S606, the copying process is executed in a step S607, and then, returning to the waiting state. Furthermore, in a step S608, the CPU 60 detects whether or not the stop/clear key 52 is operated. If "YES" is determined in the step S608, the process proceeds to the step S517 (FIG. 23). That is, if the stop/clear key 52 is operated in a case where the recognition result being correctly recognized in the previous step S5 is displayed on the LCD 36, as similar to a case where the operation of the stop/clear key 52 is detected in the step S513 (FIG. 23), according to the confirmation print flag CPF, the confirmation print operation is performed or not performed, and then, the process proceeds to the step S800. That is, the mode is transited from the automatic recognition mode to the manually input mode.

If "NO" is determined in the step S608, in a next step S609, the CPU 60 determines whether or not the menu key 34 or the set key 40 (both in FIG. 2) is operated. If the menu key 34 or the set key 40 is operated, in a next step S610, the third correction routine is executed. More specifically, if the menu key 34 or the set key 40 is operated after the respective characters of the hand-written addressing information are correctly recognized, it means that the operator intends to correct the recognition result of the addressing information, and therefore, in the next step S610, the correction is permitted.

If "NO" is determined in the step S609, in a step S611, it is determined whether or not the start key 54 (FIG. 2) is operated. If the start key 54 is operated, the process directly proceeds to the step S615. On the other hand, if "NO" is determined in the step S611, it is determined whether or not the hand-written key 59 (FIG. 2) is operated in a step S612.

If "NO" is determined in the step S612, in a next step S614, it is determined whether or not the timer counter TM which has been triggered in the previous step S605 counts the time equal to the variable numeral value being set in the timer switch CT. If the time is not counted, the process is returned to the step S606, and if the time is counted, the process proceeds to a step S615. In addition, in a case where "0" is set in the timer switch CT, the process is always returned to the step S606 irrespective of the count of the timer counter TM.

On the other hand, if "YES" is determined in the step S612, as similar to the previous step S518 (FIG. 23), the confirmation print is performed in a step S613, and thereafter, the process is returned to the step S604. That is, if the hand-writing key 59 is operated during a time that the recognition result is displayed on the LCD 36 after the respective characters of the hand-written addressing information are correctly recognized, it is possible to arbitrarily perform the confirmation print, and therefore, the confirmation print at times desired by the operator can be obtained. Furthermore, after the confirmation print in the step S613, the process returns to the step S604, and therefore, if the variable numeral value is set in the timer switch CT, the timer count is re-started in the step S605, and therefore, it is possible to have the operator a spare time for confirming the hand-written addressing information on the basis of the confirmation print.

In the step S615, the character code representative of the space being stored in the dial buffer 70 is replaced with a code representative of ";(semicolon)" so as to display the on the LCD 36. That is, in the step S611, the space code stored in the dial buffer 70 is replace with the code ";" that is pause data. Then, in a next step S616, the DTMF generation circuit 110 is controlled according to the character codes stored in the dial buffer 70, thereby to perform the dialing operation.

Figure 25:
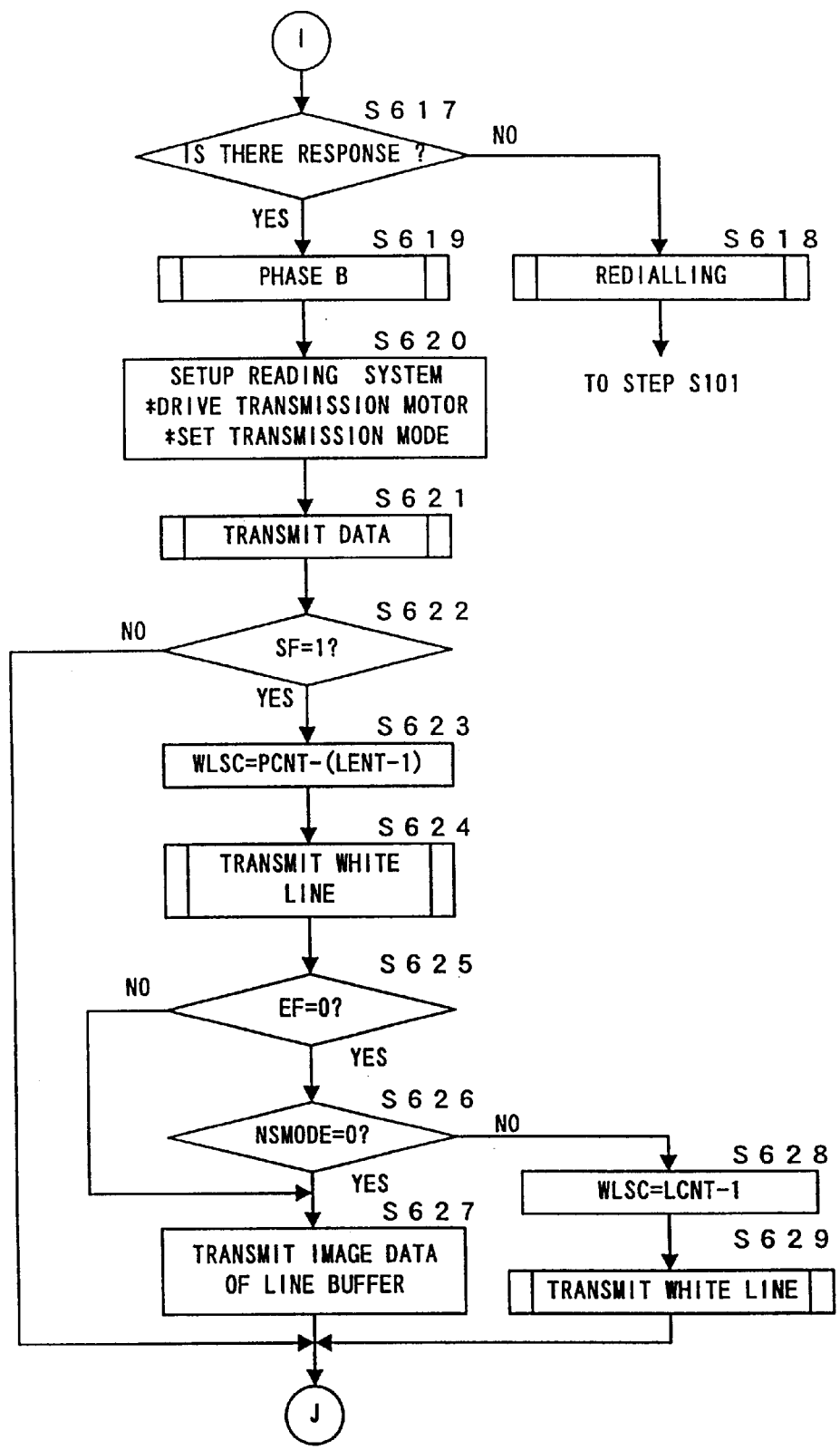

Thereafter, in a step S617 shown in FIG. 25, the CPU 60 determines on the basis of the signal from the NCU 114 whether or not there is a responsive signal from the called party specified by the addressing information. If no response, well-known re-dialing operation is performed in a step S618. When the response is detected in the step S617, in a step S619, "phase B" is executed, and therefore, the confirmation of the ability or function is performed between the facsimile apparatus. Then, in a next step S620, the CPU 60 makes the set up of the reading system. Specifically, the transmission motor 90 is driven, and the transmission mode designated by the operator by operating the image quality selection key 44 (FIG. 2), i.e. the fine mode, the half tone mode or the normal mode, for example is set. In a case where the hand-written addressing information is to be recognized, the fine mode is forcedly selected irrespective of the mode set by the operator. Then, in a case where the transmission data of the transmission original is to be transmitted after the addressing information is recognized, the transmission mode set by the operator is performed. Then, in a step S621, information of the apparatus from which the calling occurs is sent from the modem 104 to the telephone line via the NCU 114.

In a step S622, the CPU 60 determines whether or not the pre-read flag SF is set, that is, whether or not there is the image data of the addressing information which has been read in the line buffer 68. Then, if "YES" is determined in the step S622, in a next step S623, the CPU 60 calculates the white line transmission counter WLSC (FIG. 6) according to the count values of the original feed counter TCNT and the write line counter LCNT. More specifically, the original feed counter PCNT indicates the number of the lines which have been read by the CIS 100 on the original for recognizing the hand-written addressing information, and the write line counter LCNT indicates the number of the lines of the image data written in the line buffer 68. Therefore, by subtracting the number of the lines of the writing area for the hand-written addressing information, i.e. the count value of the write line counter LCNT from the count value of the paper feed counter PCNT, the number of the lines of the blank formed at an upper end of the original can be calculated. However, since no data is written in the first line of the line buffer 68 as shown in FIG. 8, the first line is also white line, and therefore, it is necessary to further subtract "−1" in the step S623. Thus, in the step S623, the number of the lines of the blank of the original above the area into which the addressing information is hand-written can be calculated. Therefore, in a step S624, the white line transmission routine is executed according to the count value of the white line transmission counter WLSC as calculated.

In a next step S625, the CPU 60 determines whether or not the error flag EF is reset. If the error flag EF is reset, it is necessary to transmit the characters hand-written in the addressing information writing area as the transmission data, and therefore, in a step S626, it is determined whether or not the transmission set mode switch NDMODE as "0", that is, it is determined whether or not the image data of the hand-written addressing information as read for recognition is to be transmitted as a portion of the transmission data. Therefore, if "YES" is determined in the step S626, in a next step S627, the image data stored in the second line to the (LCNT)-th line of the line buffer 68 is transmitted according to the transmission mode set in the previous step S620.

In addition, in a case where "1" is set in the switch NSMODE, in a step S628, the white line transmission counter WLSC is determined on the basis of the count value of the write line counter LCNT. Then, in a next step S629, as similar to the previous step S624, the white lines equal to the number indicated by the white line transmission counter WLSC are transmitted. After executing the step S627 or S629, in steps S630 to S634 shown in FIG. 26, as similar to a normal facsimile transmission, the transmission data of the original is transmitted according to the transmission mode set in the step S620. Then, in a step S634, the reading system is stopped.

Thus, the respective characters of the addressing information hand-written on the transmission original are recognized, and on the basis of the recognition result, the dialing operation is performed automatically or in response to the operation of the start key 54, and the transmission data of the original can be transmitted to the called facsimile apparatus.

Figure 27:
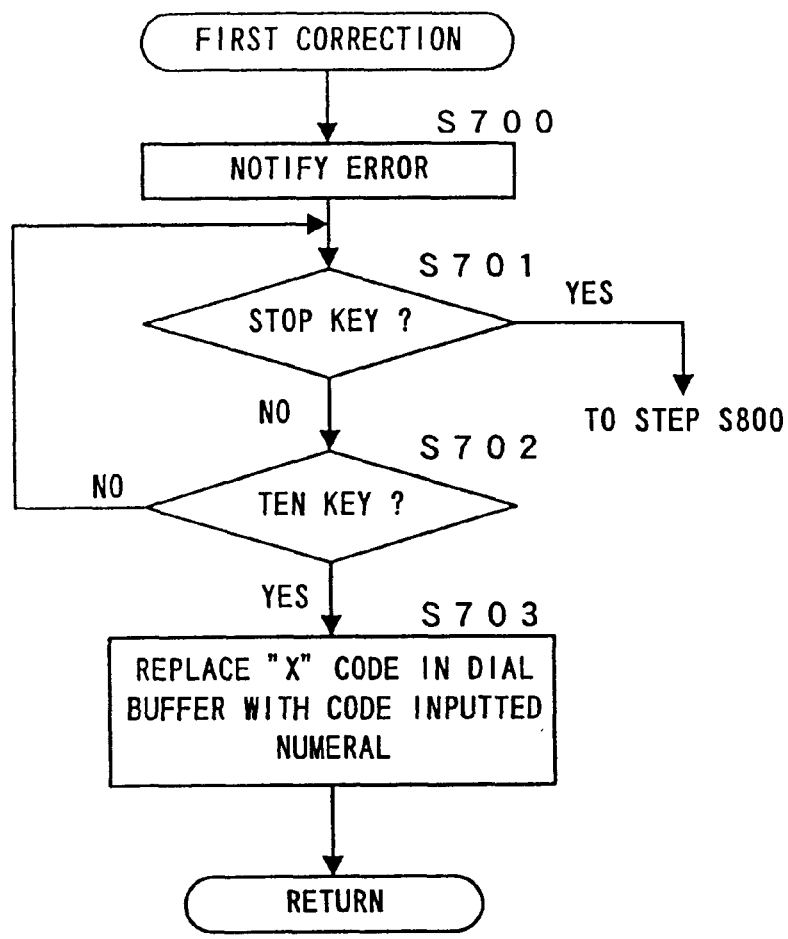
FIG. 27 is a flowchart showing a first correction routine.

Next, with referring to FIG. 27, the first correction routine executed in the previous step S524 (FIG. 23) will be described. In a first step S700 shown in FIG. 27, the CPU 60 notifies to the operator a fact that an error occurs with utilizing the speaker 128 and/or the LCD 36, for example. Thereafter, if the operation of the stop/clear key 52 is detected in a step S701, the process proceeds to the step S800 to transit the mode to the manually input mode. Furthermore, in a step S702, it is detected whether or not the ten key 16 is operated by the operator. If the ten key 16 is operated, in a step S703, a character code representative of a numeral of the ten key 16 being operated is stored in the dial buffer 70 in place of the character code of "X". That is, by operating the ten key 16 by the operator, in the step S703, it is possible to correct the character indicated as an error.

Figure 28:
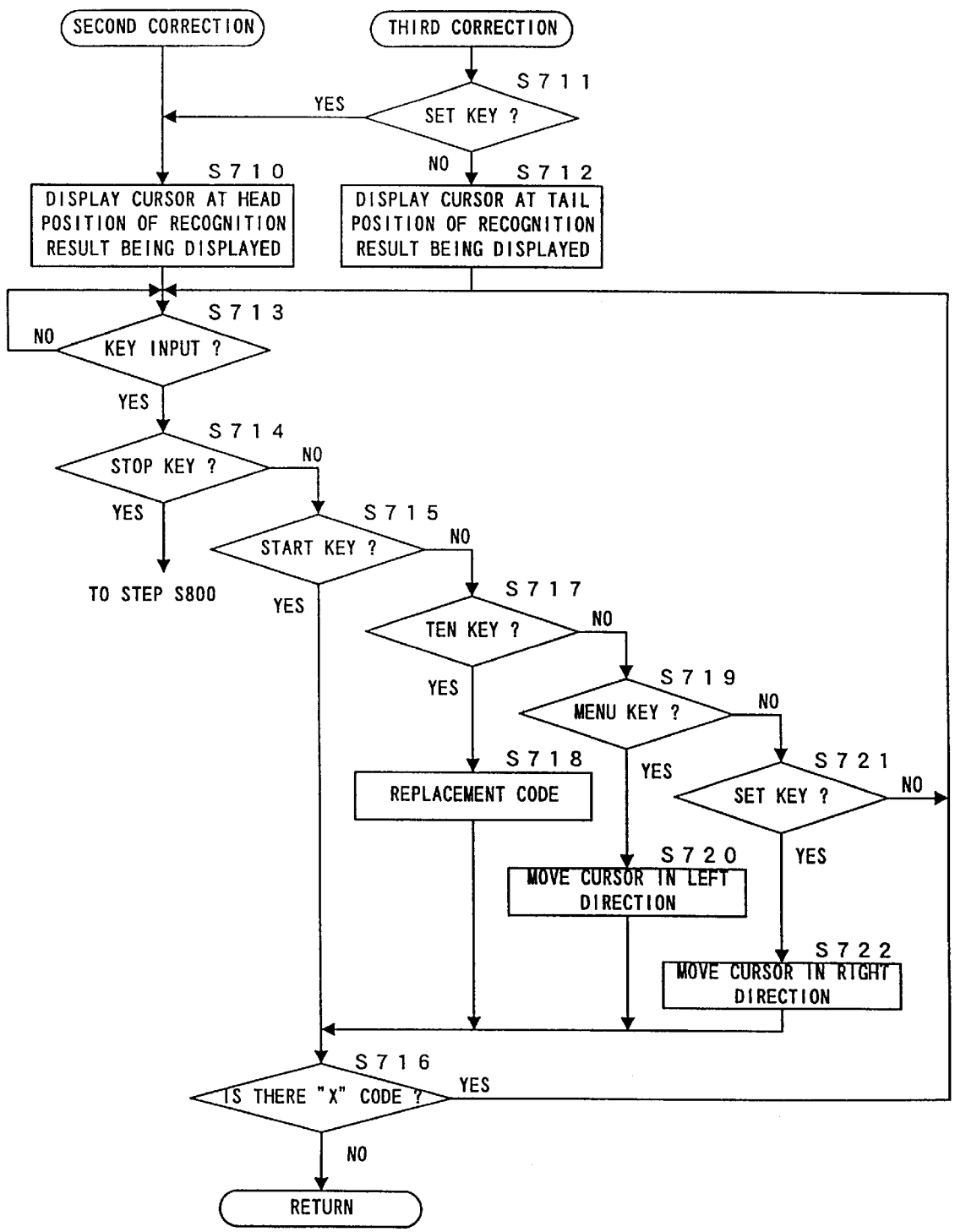
FIG. 28 is a flowchart showing a second correction routine and a third correction routine.

FIG. 28 shows the second correction routine and the third correction routine executed in the step S602 and the S610, respectively. The second correction routine and the third correction routine are approximately the same, and therefore, in the following, both will be described together with referring to FIG. 28.

In a step S711 of the third correction routine, the CPU 60 determines whether or not the set key 40 is operated. If the set key 40 is operated, in a step S710, the cursor 38 (FIG. 2) is displayed at a position of a head of the recognition result (S514) displayed on the LCD 36. In contrast, if the set key 40 is not operated, that is, if the menu key 34 is operated, in a step S712, the cursor 38 is displayed at a position of a tail of the recognition result displayed on the LCD 36. On the other hand, in the second correction routine, the above described step S710 is just executed. That is, the second correction routine and the third correction routine are different from each other in that the latter is started in response to the menu key 34 or the set key 40, but the former is started irrespective of the key operation, and operations after a step S713 are the same.

In the step S713, it is determined whether or not any key in the operation panel 14 is operated. If operated, in a next step S714, it is determined whether or not the stop/clear key 52 is operated. If "YES" is determined in the step S714, the process proceeds to the step S800 (FIG. 29). That is, in this case, the transmission operation will be executed according to the addressing information manually inputted without the recognition result of the addressing information.

Then, if "NO" is determined in the step S714, in a next step S715, the CPU 60 determines whether or not the start key 54 is operated. If the start key 54 is operated, in a step S716, it is determined whether or not there is the character code of "X" in the dial buffer 70. The process jumps out the correction routine only a time that no character code of the alphabet "X" exists in the dial buffer 70. Therefore, in a case where the character code of "X" exists in the dial buffer 70, the process returns to the previous step S713.

If the stop/clear key 52 or the start key 54 is not operated, in a step S717, the CPU 60 determines whether or not the ten key 16 is operated. If the ten key 16 is operated, in a next step S718, the character code of the dial buffer 70 at a position indicated by the cursor 38 is replaced with the character code of the numeral value inputted by the ten key 16.

If "NO" is determined in the step S717, in a step S719, it is determined whether or not the menu key 34 is operated, and if operated, the cursor 38 (FIG. 2) is moved by one digit in a left direction (step S720). Then, if "NO" is determined in the step S719, in a step S721, it is determined whether or not the set key 40 is operated. If operated, the cursor 38 is moved by one digit in a right direction in a step S722. After executing the step S718, S720 or S722 in the previous step S716, the CPU 60 determines whether or not there is the character code of "X" in the dial buffer 70. Thus, the correction for the rejected character which occurs in recognizing the hand-written addressing information can be performed.

FIG. 29 shows an operation for inputting the addressing information manually. In the first step S800 of FIG. 29, the CPU 60 clears the dial buffer 70. Then, in a next step S801, the CPU 60 displays the message of "PLEASE ENTRY NUMBER", for example on the LCD 36, and waits for the operator inputs the addressing information through the manual operation of the ten key 16 and etc. Then, in a step S802, the CPU 60 determines whether or not the copy key 58 is operated. If the copy key 58 is operated, after the copy routine is executed in a step S803, the process returns to the step S101, i.e. the waiting state. In addition, in a step S804, it is determined whether or not the stop/clear key 52 is operated. If "YES" is determined in the step S804, after the original is discharged in a step S805, the process returns to the waiting state.

In a next step S806, the CPU 60 determines whether or not the hand-writing key 59 is operated. If the hand-writing key 59 is operated, the CPU 60 determines in a step S807 that the automatic recognition mode transition flag CAF is not set and whether or not the pre-read flag SF is set. If "YES" is determined, in order to transit the mode from the manually input mode of the addressing information to the automatic recognition mode, the CPU 60 returns the process to the step S500, and therefore, the recognition process for the image data stored in the line buffer 68 is re-started. On the other hand, if "NO" is determined in the step S806, the operation of the hand-writing key 59 is made in valid. If the automatic recognition mode transition flag CAF is not set and the pre-read flag SF is set, it means that the image data of the hand-written addressing information is stored in the line buffer 68 and thus it is possible to perform the automatic recognition of the addressing information on the basis of the image data.

In a step S808, the CPU 60 determines whether or not the ten key 16 is operated. If not operated, in a step S809, the CPU 60 determines whether or not other key is operated, and then, if the other key is operated, in a next step S810, the process defined by the other key is executed.

Figure 26:
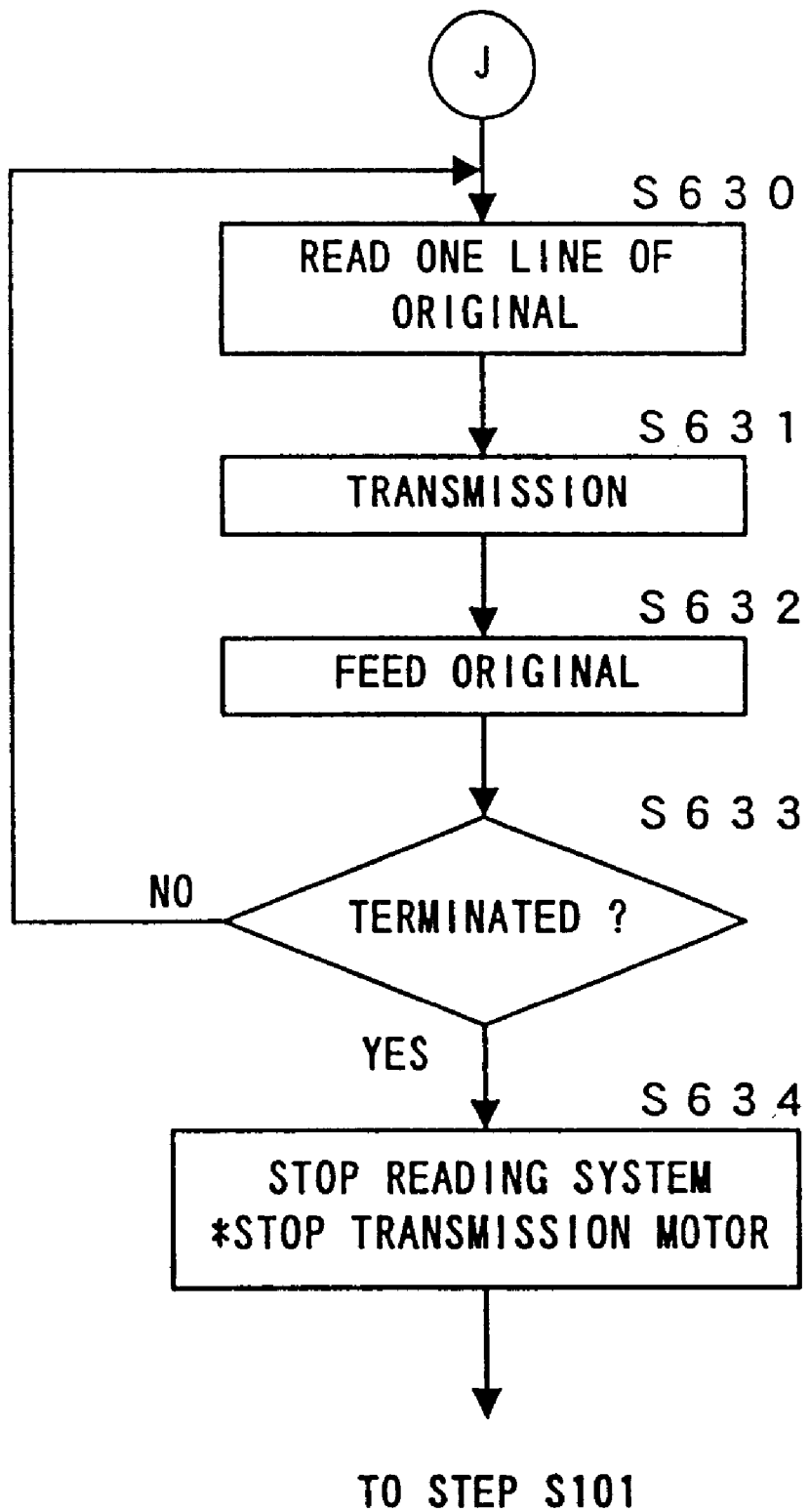

If the ten key 16 is operated, in a step S811, the CPU 60 sets the character code of the numeral value for the addressing information being inputted by the ten key 16 in the dial buffer 70. Then, in a step S812, the CPU 60 waits for the operation of the start key 54. If the start key 54 is operated in the step S812, the process proceeds to the step S616 (FIG. 26).

Figure 30:
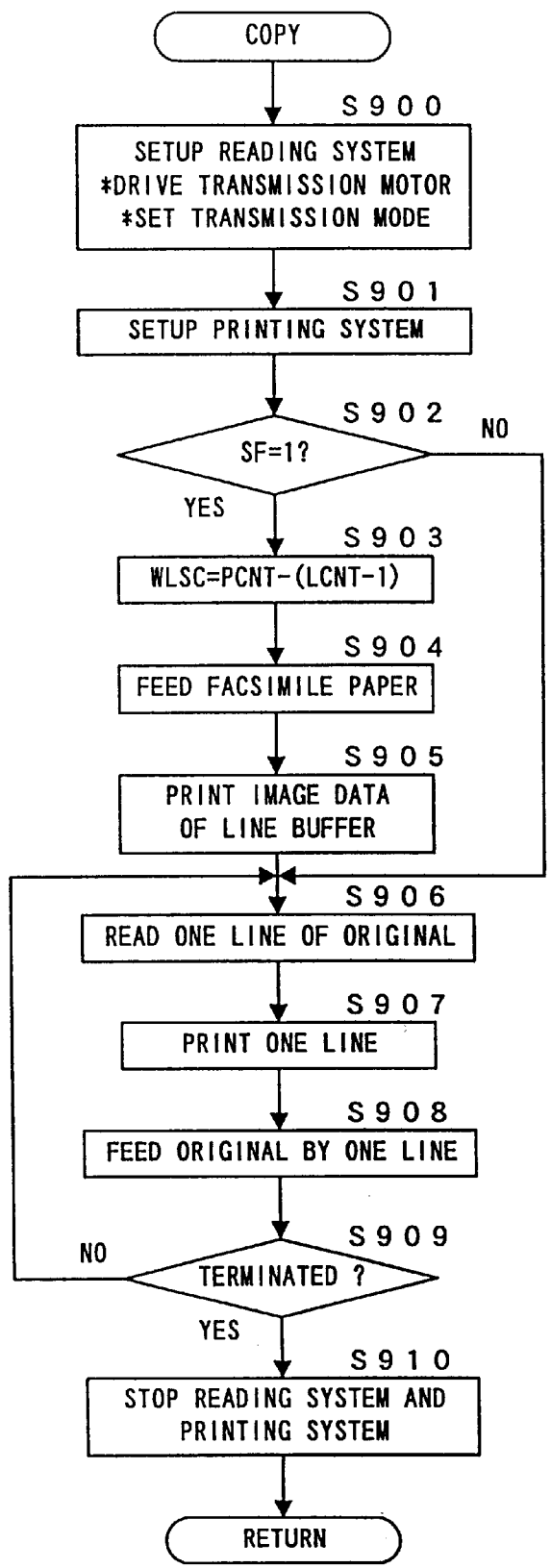
FIG. 30 is a flowchart showing a copy routine.

The copy routine executed in the step S607 or the step S803 is shown in FIG. 30. In a first step S900 of the copy routine, the CPU 60 performs the setup of the reading system. That is, the transmission motor 90 is driven and the CIS 100 and the image processing circuit 98 are set according to the transmission mode determined in the step S626. Then, in a next step S901, the CPU 60 performs the set up of a printing system. That is, in the step S901, the CPU 60 applies an order signal to the motor control circuit 88 to drive the reception motor 92 (FIG. 3). Then, in a next step S902, the CPU 60 determines whether or not the pre-read flag SF is set. If the pre-read flag SF is set, it means that the image data read by the CIS 100 from the addressing information writing area and stored in the line buffer 68 is to be printed-out as the copy image, and therefore, steps S903 to S905 are executed. More specifically, in the step S903 as similar to the previous step S623 (FIG. 25), the white line transmission counter WLSC is determined on the basis of the count values of the original feed counter PCNT and the write line counter LCNT. Then, in the next step S904, the facsimile paper (recording paper) is fed by the reception motor 92 by the number of the lines according to the count value of the white line transmission counter WLSC determined in the step S903. Next, in a step S905, the image data of the second line to the (LCNT)-th line of the line buffer 68 is printed-out on the facsimile paper (recording paper) by the thermal head 84.

Thereafter, as similar to a case where the pre-read flag SF is not set, steps S906 to S909 are executed. That is, in the steps S906 to S909, a portion of the text on the original is copied. Then, if it is determined that the copy is terminated is detected in the step S909, in a step S910, the CPU 60 stops the reading system and the printing system.

Figure 31:
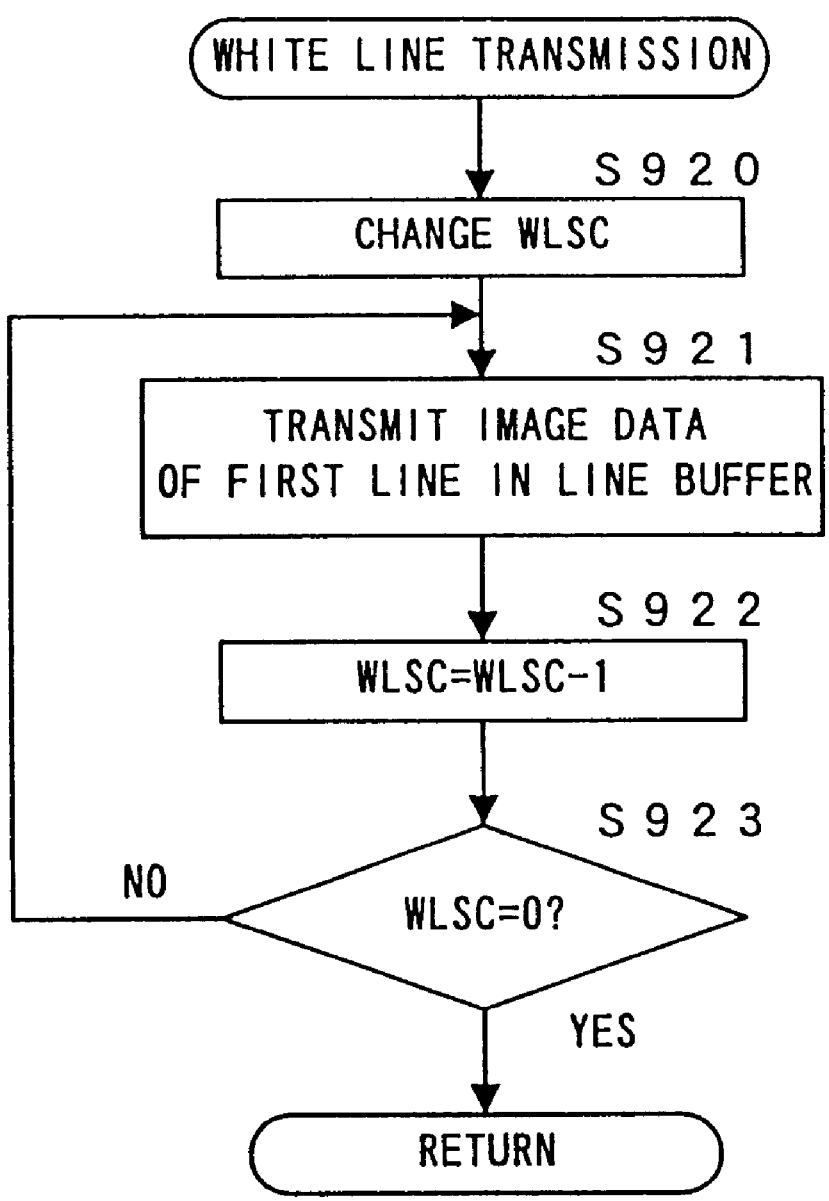
FIG. 31 is a flowchart showing a white line transmission routine.

FIG. 31 is a flowchart showing the white line transmission routine executed in the step S624 or S629. In a first step S920 of FIG. 31, the CPU 60 changes the white line transmission counter WLSC according to the transmission mode determined in the step S620. For example, if the transmission mode set by the operator is the normal mode, the count value of the white line transmission counter WLSC is made half. A reason why the count value of the white line transmission counter WLSC is made ½ is that the white line transmission counter WLSC counts the number of the lines in the fine mode. Then, in a next step S921, the image data of the first line of the line buffer 68 is read and transmitted according to the transmission mode as determined. Then, in a step S922, the white line transmission counter WLSC is decremented, and in a step S923, it is determined whether or not the count value of the white line transmission counter WLSC becomes "0", that is, it is determined whether or not all the white lines to be transmitted have been transmitted.

In addition, in the above described embodiment, it is determined whether or not the hand-written addressing information is correctly recognized through the determination whether or not a predetermined number of the characters are not recognized. However, it may be determined by determining whether or not a ratio of the characters not recognized with respect to all the characters to be recognized is a predetermined value or more.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A facsimile apparatus, comprising:

a transmission motor for moving a transmission original in a sub-scanning direction;

an original reading means for scanning each of lines sequentially arranged in said sub-scanning direction in a main scanning direction and for outputting image data of a black dot or a white dot;

an area specifying means for receiving said image data from said original reading means for specifying an area on the basis of a start line which is determined by a fact that the black dot is first detected and an end line, which is determined by a fact that a first predetermined number of white lines in each of which no black dot is detected, appears after said start line;

an addressing information recognition means for recognizing addressing information on the basis of said image data from said original reading means which reads said area specified by said area specifying means; and a calling means for performing a calling operation according to a recognition result by said addressing information recognition means.

2. A facsimile apparatus according to claim 1, further comprising a valid line detection means for detecting as a valid line a line in which a second predetermined number of more black dots are successive in said main scanning direction, wherein said area specifying means includes a start line determination means for determining a first valid line as said start line.

3. A facsimile apparatus according to claim 1 or 2 wherein said area specifying means includes an end line determination means for determining said end line as the line at which a third predetermined number of white lines successively appear after said start line, and said area specifying means specifies said area on the basis of said start line and said end line.

4. A facsimile apparatus according to claim 1, further comprising a first motor stopping means for stopping said transmission motor at a time that said end line is determined.

5. A facsimile apparatus according to claim 4, further comprising a second motor stopping means for stopping said transmission motor at a time that said original reading means reads a fourth predetermined number of lines of said original from said start line.

6. A facsimile apparatus according to claim 5, further comprising a valid line number determining means for determining whether at least a fifth predetermined number of valid lines occur successively after said start line; and a means for making a determination of said start line by said area specifying means at a time when said valid line number determination means determines that at least said fifth predetermined number of said valid lines are not successive.

7. A facsimile apparatus according to claim 1, further comprising a line buffer capable of storing said image data from said original reading means for a sixth predetermined number of lines; and a writing means for writing said image data from said original reading means of lines from said start line to said end line, wherein said addressing information recognition means recognizes said addressing information on the basis of said image data stored in said line buffer.

8. A facsimile apparatus according to claim 7, further comprising a transmission condition setting means (NSMODE) for setting one of a first condition that the image data stored in said line buffer is to be transmitted and a second condition that the image data stored in said line buffer is not to be transmitted;

a first transmission means for transmitting said image data of said line buffer at a time when said first condition is set by said transmission condition setting means; and a second transmission means for transmitting the image data from said original reading means which reads a portion of said transmission original other than said area.

9. A facsimile apparatus according to claim 8, further comprising a third transmission means for transmitting said image data of said line buffer as blank data at a time that said second condition is set by said transmission condition setting means.

10. A facsimile apparatus according to claim 1, further comprising a first reading accuracy setting means for variably setting a reading accuracy of said original reading means; and a second reading accuracy setting means for forcedly setting a specific reading accuracy irrespective of the reading accuracy set by said first reading accuracy setting means at a time when said area is read by said original reading means.

11. A facsimile apparatus according to claim 10, further comprising a transmission request means (NSMODE) for requesting transmission of the image data obtained by reading said area by said original reading means;

a first transmission means for transmitting said image data with the reading accuracy set by said first reading accuracy setting means according to a request by said transmission request means; and a second transmission means for transmitting the image data from said original reading means which reads a portion of said transmission original other than said area with the reading accuracy set by said first reading accuracy setting means.

12. A facsimile apparatus according to claim 11, further comprising a third transmission means for transmitting said image data of said line buffer as blank data with the reading accuracy set by said first reading accuracy setting means at a time when no request from said transmission request means occurs.

13. A facsimile apparatus according to claim 1, further comprising a manual input means for manually inputting the addressing information; and a first mode setting means (RF) for selectively setting one of an automatic mode in which a calling operation is automatically started according to the addressing information recognized by said addressing information recognition means, and a manual mode in which a calling operation is started according to the addressing information input by said manually input means.

14. A facsimile apparatus according to claim 13, further comprising a second detection means for detecting that said manual input means is being operated during a period of time from the setting of said transmission original to the performance of the calling operation according to said addressing information when said automatic mode is set by said first mode setting means, wherein said first mode setting means sets said manual mode in response to a detection by said second detection means.

15. A facsimile apparatus according to claim 13, further comprising a third detection means for detecting that said addressing information is not being read by said original reading means at a time when said automatic mode is set by said first mode setting means, wherein said first mode setting means sets said manual mode in response to detection by said third detection means.

16. A facsimile apparatus according to claim 1, further comprising a suspending means for suspending a process from a time when said addressing information is recognized by said addressing information recognition means to a time when said calling means performs the calling operation.

17. A facsimile apparatus according to claim 16, further comprising a suspended time setting means (CT) for variably setting a time during which the process is suspended by said suspending means, wherein said suspending means suspends the process by the time set by said suspended time setting means.

18. A facsimile apparatus according to claim 16 or 17, further comprising a manually operating key capable of being manually operated, wherein said suspending means suspends the process until said manually operating key is operated.

19. A facsimile apparatus according to claim 1, further comprising a line buffer means for storing the image data represented by the black dot or the white dot from said original reading means, wherein said addressing information recognition means recognizes the addressing information on the basis of said image data in said line buffer means, further comprising:

a correction mode setting means (EMODE) for setting a correction mode when the recognition result by said addressing information recognition means is to be corrected;

a manual operating key manually operated in said correction mode; and a dial buffer means for storing a character code of the addressing information being corrected according to an operation of said manual operating key, wherein said calling means performs the calling operation according to the character code in said dial buffer means.

20. A facsimile apparatus according to claim 19, wherein said correction mode setting means includes a first correction mode setting means for setting a first correction mode at a time when one or more characters of said addressing information cannot be recognized by said addressing information recognition means, and further comprising a display means for displaying a specific symbol for the character not recognized.

21. A facsimile apparatus according to claim 20, wherein said first correction mode setting means includes a one character correction mode setting means for setting a one character correction mode such that one character is corrected every time one character of said addressing information cannot be recognized by said addressing information recognition means.

22. A facsimile apparatus according to claim 21, wherein said addressing information recognition means recognizes a next character after a character code corrected by said manual operating key is stored in said dial buffer means at a time when said one character correction mode is set.

23. A facsimile apparatus according to claim 20 wherein said first correction mode setting means includes a bundle correction mode setting means for setting a bundle correction mode such that the characters are corrected in a bundle after all of the characters of said addressing information are recognized by said addressing information recognition means.

24. A facsimile apparatus according to claim 23, wherein said correction mode setting means includes a second correction mode setting means for manually setting a second correction mode at a time when all of the characters of said addressing information are correctly recognized by said addressing information recognition means.

25. A facsimile apparatus according to claim 1, further comprising a holding means for holding the image data output from said original reading means;

a first order means for applying a first printing order; and a printing means for printing said image data held in said holding means in response to said first printing order.

26. A facsimile apparatus according to claim 25, further comprising an invalid means for making the recognition result by said addressing information recognition means invalid at a time when said image data is printed in response to said first print order.

27. A facsimile apparatus according to claim 26, further comprising a manual input means for manually inputting the addressing information, wherein said calling means performs the calling operation according to the addressing information input by said manual input means.

28. A facsimile apparatus according to claim 27, further comprising a second order means for applying a second print order, wherein said print means prints said image data in response to said second print order.

29. A facsimile apparatus according to claim 28, further comprising a re-calling means for applying said image data in said line buffer to said addressing information recognition means, and for performing the calling operation according to the recognition result of said addressing information recognition means at a time when said second print order is applied in succession to said first print order.

30. A facsimile apparatus according to claim 28, wherein said first order means sets a mode transition from said automatic recognition mode to said manual input mode, and said second order means sets a mode transition from said manual input mode to said automatic recognition mode, further comprising an inhibiting means for inhibiting said image data from being printed by said print means at a time when at least two transitions from said automatic recognition mode to said manual input mode are set by said first order means.

31. A facsimile apparatus according to claim 1, further comprising:
   a modem for a facsimile transmission;
   a handset for communication with voice;
   a connection means for selectively connecting one of said modem and said handset to a telephone line;
   a detection means for detecting an off-hook state of said handset; and
   a control means for causing said connection means to connect said handset to said telephone line and said calling means in order to perform the calling operation according to said recognition result at a time when said off-hook state is detected by said detection means.

32. A facsimile apparatus according to claim 31, further comprising a display means for displaying said recognition result, wherein said control means is responsive to said off-hook state being detected by said detection means after said recognition result is displayed by said displaying means.

33. A facsimile apparatus according to claim 32, further comprising a condition determination means for determining whether a predetermined condition is satisfied after said recognition result is displayed by said display means until said off-hook state is detected by said detection means, wherein said control means causes said calling means to perform the calling operation at a time when it is determined that said predetermined condition is satisfied.

34. A facsimile apparatus according to claim 33, wherein said predetermined condition is a condition based on whether a specific key is operated.

35. A facsimile apparatus according to claim 33, wherein said predetermined condition is based on whether a predetermined time period lapses from a time that said recognition result is displayed by said display means.

36. A facsimile apparatus according to claim 1, further comprising a holding means for holding said image data output from said original reading means, wherein
   said addressing information recognition means includes a cut-out means for cutting-out the image data from said holding means for each character, a pattern recognition means for performing a pattern recognition of the image of the character cut-out by said cut-out means, and a result holding means for holding a recognition result of the character by said pattern recognition means, further comprising
   a recognition judge means for judging on the basis of the recognition result of the character held by said result holding means whether said addressing information is correctly recognized.

37. A facsimile apparatus according to claim 36, further comprising a clear means for clearing said result holding means at a time when it is determined by said recognition judge means that said addressing information is not correctly recognized.

38. A facsimile apparatus according to claim 37, further comprising an enable means for enabling said calling means at a time when it is determined by said recognition judge means that said addressing information is correctly recognized.

39. A facsimile apparatus according to claim 36, wherein said recognition judge means judges whether a predetermined number of the characters are not recognized.

40. A facsimile apparatus according to claim 36, wherein said recognition judge means judges whether a ratio of the characters not recognized with respect to all the characters to be recognized is at least a predetermined value.

41. A facsimile apparatus according to claim 38, further comprising a manual input means for manually inputting the addressing information, and control means for causing said calling means to perform the calling operation according to the addressing information manually input by said manual input means after said result holding means is cleared.

42. A facsimile apparatus according to claim 41, further comprising a determination means for determining whether the image data in said holding means is to be transmitted at a time when said calling means performs the calling operation according to the addressing information manually inputted.

43. A facsimile apparatus, comprising:
   a transmission motor for moving a transmission original on which addressing information is hand-written in a sub-scanning direction;
   an original reading means for scanning each line sequentially arranged in said sub-scanning direction in a main scanning direction and for outputting image data of a black dot or a white dot;
   a first reading accuracy setting means for variably setting a reading accuracy of said original reading means; and
   a second reading accuracy setting means for forcedly setting a specific reading accuracy irrespective of the reading accuracy set by said first reading accuracy setting means at a time when said addressing information is read by said original reading means.

44. A facsimile apparatus, comprising:
   an original reading means for scanning a transmission original on which addressing information is hand-written in order to read said addressing information and for outputting image data of a black dot or a white dot;
   a holding means for holding the image data;
   a cut-out means for cutting-out the image data of one character of said addressing information from said holding means;
   a recognition means for pattern-recognizing the image data of one character cut-out by said cut-out means;
   a calling means for performing a calling operation on the basis of a recognition result by said recognition means;
   a first order means for applying a first printing order; and
   a printing means for printing said image data held in said holding means in response to said first printing order.

45. A facsimile apparatus, comprising:

a modem for facsimile transmission;

a handset for communication with voice;

a connection means for selectively connecting one of said modem and said handset to a telephone line;

an original reading means for scanning a transmission original on which addressing information is handwritten in order to read said addressing information and for outputting image data of a black dot or a white dot;

a recognition means for pattern-recognizing the image data from said original reading means;

a storing means for storing a recognition result by said recognition means;

a display means for displaying the recognition result stored in said storing means;

a calling means for performing a calling operation according to the recognition result of said recognition means;

a detection means for detecting an off-hook state of said handset; and a control means for causing said connection means to connect said handset to said telephone line and said calling means to perform the calling operation according to said recognition result at a time when said off-hook state is detected by said detection means after said recognition result is displayed by said display means.

46. A facsimile apparatus comprising:

an original reading means for scanning a transmission original on which addressing information is handwritten in order to read said addressing information and for outputting image data of a black dot or a white dot;

a holding means for holding the image data;

a recognition means for pattern-recognizing the image data held by said holding means for each character;

a result holding means for holding a recognition result of said recognition means;

a recognition judgment means for judging on the basis of the recognition result of the character held by said result holding means whether said addressing information is correctly recognized, and for outputting a first judgment result when said addressing information is not correctly recognized and a second judgment result when said addressing information is correctly recognized;

a clear means for clearing said holding means in response to said first judgment result of said recognition judgment means; and a calling means for performing a calling operation on the basis of a recognition result held by said result holding means in response to said second judgment result by said recognition judgment means.

* * * * *